United States Patent
Yamada et al.

(10) Patent No.: US 10,803,352 B2
(45) Date of Patent: Oct. 13, 2020

(54) IMAGE PROCESSING APPARATUS, IMAGE PROCESSING METHOD, AND IMAGE PROCESSING PROGRAM

(71) Applicant: FUJITSU LIMITED, Kawasaki-shi, Kanagawa (JP)

(72) Inventors: Goro Yamada, Adachi (JP); Iwao Yamazaki, Atami (JP)

(73) Assignee: FUJITSU LIMITED, Kawasaki (JP)

( * ) Notice: Subject to any disclaimer, the term of this patent is extended or adjusted under 35 U.S.C. 154(b) by 212 days.

(21) Appl. No.: 15/920,576

(22) Filed: Mar. 14, 2018

(65) Prior Publication Data

US 2018/0276500 A1 Sep. 27, 2018

(30) Foreign Application Priority Data

Mar. 27, 2017 (JP) .................. 2017-060876

(51) Int. Cl.
| | | |
|---|---|---|
| *G06K 9/62* | (2006.01) | |
| *G06T 19/20* | (2011.01) | |
| *G06K 9/00* | (2006.01) | |
| *G06T 15/50* | (2011.01) | |
| *G06K 9/66* | (2006.01) | |

(52) U.S. Cl.
CPC ....... *G06K 9/6256* (2013.01); *G06K 9/00214* (2013.01); *G06K 9/66* (2013.01); *G06T 15/506* (2013.01); *G06T 19/20* (2013.01); *G06T 2219/2016* (2013.01); *G06T 2219/2021* (2013.01)

(58) Field of Classification Search
CPC .... G06K 9/00214; G06K 9/6256; G06K 9/66; G06T 15/506; G06T 19/20; G06T 2219/2016; G06T 2219/2021
See application file for complete search history.

(56) References Cited

U.S. PATENT DOCUMENTS

2015/0065803 A1* 3/2015 Douglas ............. A61B 1/00009
600/200

FOREIGN PATENT DOCUMENTS

| JP | 2010-211732 | 9/2010 |
|---|---|---|
| JP | 2016-62225 | 4/2016 |

OTHER PUBLICATIONS

Krizhevsky, Alex et al., "ImageNet Classification with Deep Convolutional Neural Networks," 2012, pp. 1-9 [online], [retrieved on Mar. 23, 2017]. Retrieved from the Internet <URL:https://papers.nips.cc/paper/4824-imagenet-classification-with-deep-convolutional-neural-networks.pdf>.

Peng, Xingchao et al., "Learning Deep Object Detectors from 3D Models," IEEE, 2015, pp. 1278-1286 [online], [retrieved on Mar. 23, 2017]. Retrieved from the Internet <URL: http://www.karimali.org/publications/PSAS_ICCV15.pdf>.

* cited by examiner

*Primary Examiner* — Manuchehr Rahmjoo
(74) *Attorney, Agent, or Firm* — Fujitsu Patent Center

(57) ABSTRACT

An image processing method performed by a computer, the method including: changing a rendering parameter in a three-dimensional model of a recognition target; and generating teacher data of the recognition target based on the rendering parameter changed by the changing. Thereby, sufficient amount of teacher data can be obtained, without any unfavorable redundancy.

9 Claims, 22 Drawing Sheets

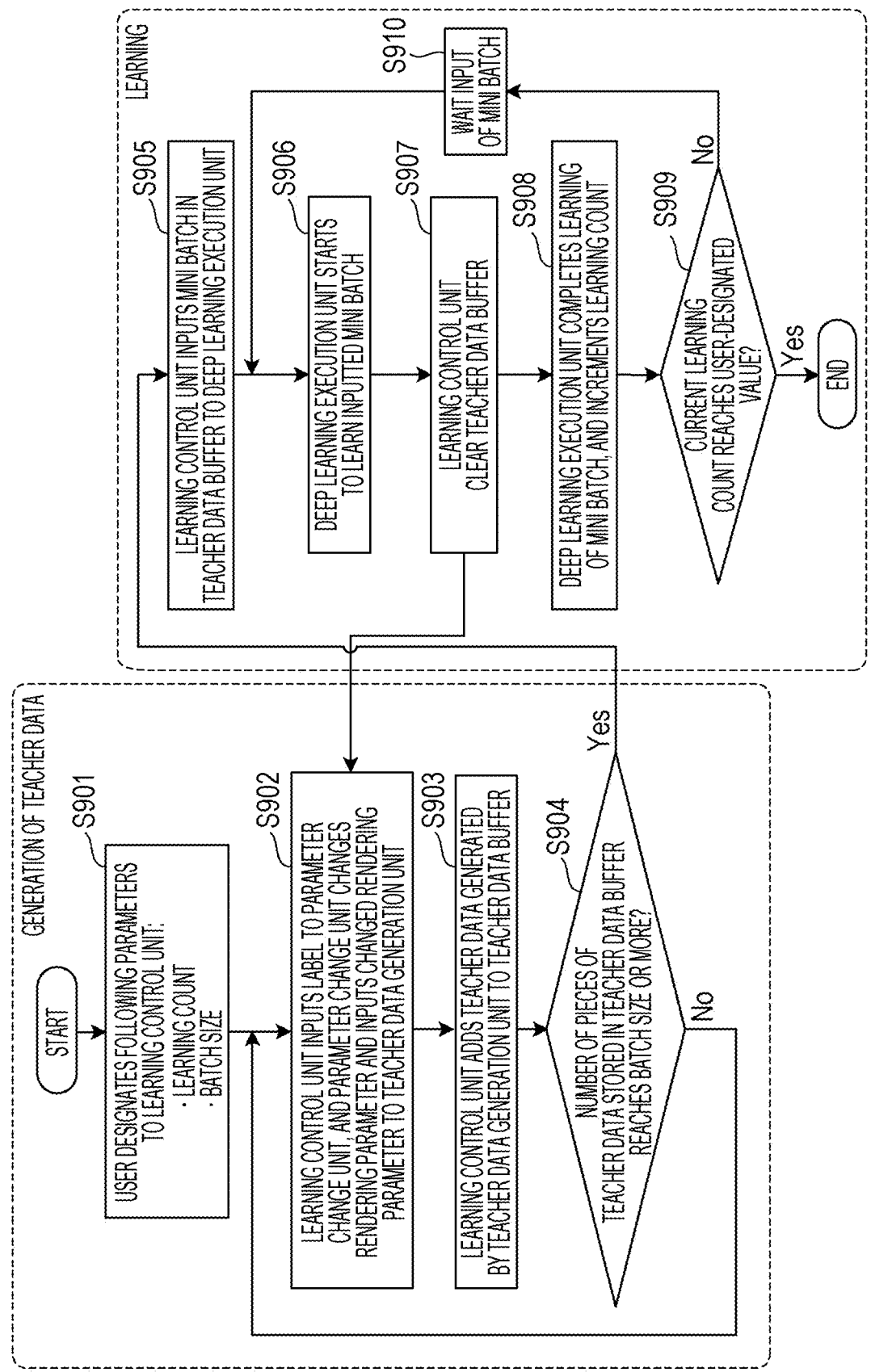

IMAGE PROCESSING APPARATUS, IMAGE PROCESSING METHOD, AND IMAGE PROCESSING PROGRAM

CROSS-REFERENCE TO RELATED APPLICATION

This application is based upon and claims the benefit of priority of the prior Japanese Patent Application No. 2017-60876, filed on Mar. 27, 2017, the entire contents of which are incorporated herein by reference.

FIELD

The embodiments discussed herein are related to an image processing apparatus, an image processing method, and an image processing program.

BACKGROUND

Today, among machine learning methods in an artificial intelligence field, deep learning has achieved remarkable outcome particularly in the field of image recognition. However, putting deep learning into practical use for any purposes including image recognition has a problem in that the deep learning has to use a large quantity of teacher data in various variations. In most cases, collecting a large quantity of such teacher data is practically difficult in terms of time, costs, and procedures related to copyrights. When the teacher data is insufficient, learning may not be satisfactorily performed, leading to poor recognition accuracy.

To address this, it has been proposed to generate plural pieces of data from image data by using light models changed by three-dimensional computer graphics (3DCG), and thereby to create plural pieces of teacher data for image detection (see Japanese Laid-open Patent Publication No. 2016-62225, for example).

Further, it has been proposed to generate plural pieces of data with movement variations by 3DCG from an image taken using a camera to create plural pieces of teacher data for image detection (see Japanese Laid-open Patent Publication No. 2010-211732, for example).

In deep learning, it has been also proposed to increase variations of teacher data by a method referred to as "data augmentation" in the case of a small number of pieces of teacher data (see Alex Krizhevsky, Ilya Sutskever, and Geoffrey E. Hinton, "Image Net Classification with Deep Convolutional Neural Networks", Mar. 23, 2017, [online], <https://papers.nips.cc/paper/4824-imagenet-classification-with-deep-convolutional-neural-networks.pdf>, for example). According to "data augmentation", color change, deformation, scaling, or clipping of images is performed without losing the characteristics of teacher data.

To augment teacher data, use of a three-dimensional (3D) model has been reported (see Xingchao Peng, Baochen Sun, Karim Ali, and Kate Saenko, "Learning Deep Object Detectors from 3D Models", Mar. 23, 2017, [online], <URL:http://www.karimali.org/publications/PSAS_ICCV15.pdf>, for example). According to this method, an image rendering a 3D model of a recognition target is used as teacher data.

However, "data augmentation" is merely image processing, and for example, may not generate an image of a side or the rear of an automobile from an image taken from the front of the automobile.

In addition, the conventional method using 3D models has a problem that teacher data which may lead to incorrect recognition are obtained as compared with teacher data using an actually-taken photograph for the following reasons.

(1) Appearance Variations Depend on the Number of 3D Models. In deep learning, it is important to increase variations of teacher data. However, the conventional method can generate only teacher data having fixed texture and shape, and accordingly variations are determined depending on the number of 3D models. Collecting a large number of 3D models incurs high costs, and thus is impractical.

(2) Teacher data in which a recognition target is masked may not be generated.

Deep learning using image as input data is advantageous in that when teacher data includes teacher data with a partially masked recognition target, the teacher data with a partially masked recognition target may be correctly recognized by deep learning. However, the conventional method is not capable of generating teacher data including a partially masked recognition target, and this results in a high probability that the teacher data including the partially masked recognition target fails to be recognized.

An object of one aspect of the disclosure is to provide an image processing apparatus, an image processing method, an image processing program, and a teacher data generation method that may achieve a higher recognition rate than conventional methods.

SUMMARY

According to an aspect of the invention, an image processing method performed by a computer, the method including: changing a rendering parameter in a three-dimensional model of a recognition target; and generating teacher data of the recognition target based on the rendering parameter changed by the changing. Thereby, sufficient amount of teacher data can be obtained, without any unfavorable redundancy.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 25 is a flow chart illustrating an example of the flow of processing of the entire image processing apparatus in Embodiment 2.

DESCRIPTION OF EMBODIMENTS

Figure 1:
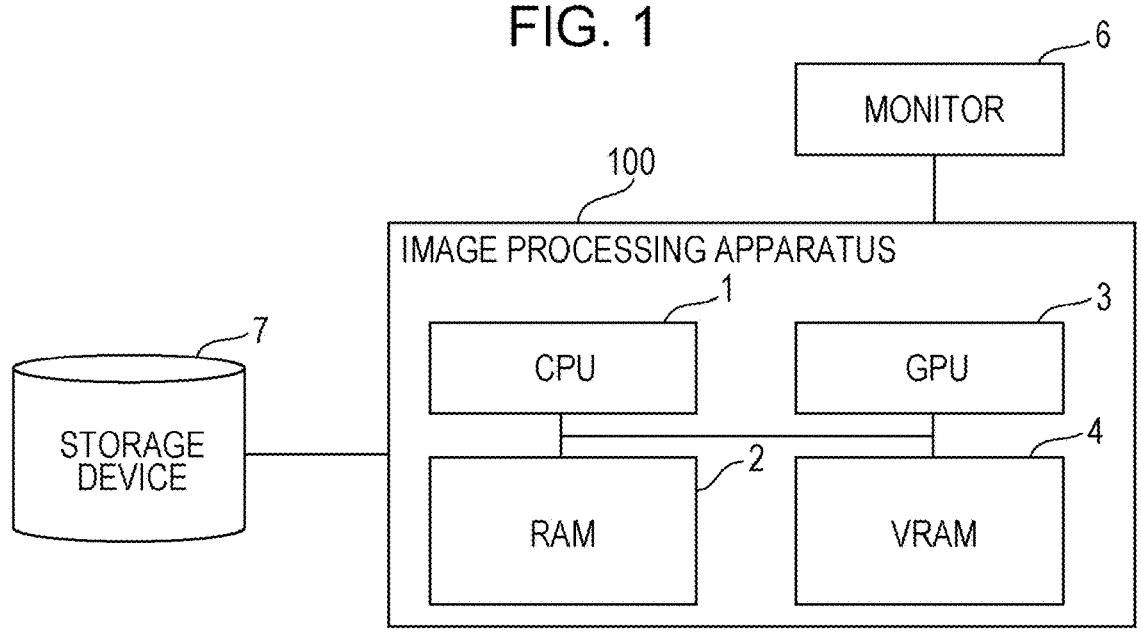
FIG. 1 is a block diagram illustrating an example of hardware configuration of an entire image processing apparatus.

Embodiments of the disclosure will be described below, but the disclosure is not limited to these embodiments.

Since control performed by a parameter change unit and a teacher data generation unit in an "image processing apparatus" of the disclosure corresponds to implementation of an "image processing method" of the disclosure, details of the "image processing method" of the disclosure become apparent from description of the "image processing apparatus" of the disclosure. Further, since an "image processing program" of the disclosure is realized as the "image processing apparatus" of the disclosure by using a computer or the like as a hardware resource, details of the "image processing program" of the disclosure become apparent from description of the "image processing apparatus" of the disclosure.

Since control performed by a parameter change unit and a teacher data generation unit in a "teacher data generation apparatus" corresponds to implementation of a "teacher data generation method" of the disclosure, details of the "teacher data generation method" of the disclosure become apparent from description of the "teacher data generation apparatus". Further, since a "teacher data generation program" is realized as the "teacher data generation apparatus" by using a computer or the like as a hardware resource, details of the "teacher data generation program" become apparent from description of the "teacher data generation apparatus".

Preferably, the image processing apparatus of the disclosure serves to perform image recognition using teacher data of a recognition target, and image recognition is performed by deep learning.

Preferably, the image processing apparatus includes a parameter change unit that changes a rendering parameter in a three-dimensional model of the recognition target, and a teacher data generation unit that generates teacher data of the recognition target based on the rendering parameter changed by the parameter change unit, and further includes a learning unit and an inference unit. Preferably, the rendering parameter may be randomly changed, for example, by using random numbers.

The recognition target refers to a target to be recognized (classified). The recognition target is not specifically limited, and may be appropriately selected according to intended use. Examples of the recognition target include various images of human's face, bird, dog, cat, monkey, strawberry, apple, steam train, train, large-sized automobile (bus, truck), middle-sized automobile (family car), ship, airplane, figures, characters, and objects that are viewable to human.

The teacher data refers to a pair of "input data" and "correct label" that is used in supervised deep learning. Deep learning is performed by inputting the "input data" to a neural network having a lot of parameters to update a difference between an inference label and the correct label (weight during learning) and find a learned weight. Thus, the mode of the teacher data depends on an issue to be learned (thereinafter the issue may be referred to as "task"). Some examples of the teacher data are illustrated in a following table 1.

TABLE 1

| Task | Input | Output |
| --- | --- | --- |
| Classify animal in image | Image | Class (also referred to as label) |
| Detect area of automobile in image in unit of pixels | Image | Image set (output image of 1ch for object) |
| Determine whose voice it is | Voice | Class |

Deep learning is one kind of machine learning using a multi-layered neural network (deep neural network) mimicking the human's brain, and may automatically learn characteristics of data.

Image recognition serves to analyze contents of image data, and recognize the shape. According to image recognition, the outline of a target is extracted from the image data, separates the target from background, and analyzes what the target is. Examples of technique utilizing image recognition include optical character recognition (OCR), face recognition, and iris recognition.

According to image recognition, a kind of pattern is taken from image data that is a collection of pixels, and meaning is read off the pattern. Analyzing the pattern to extract meaning of the target is referred to as pattern recognition. Pattern recognition is used for image recognition as well as speech recognition and language recognition.

A three-dimensional model of a recognition target is an aggregate formed by connecting three-dimensional coordinates to each of apexes of a two-dimensional polygon connecting the three-dimensional coordinates to each other.

Three-dimensional computer graphics (3DCG) is a method of converting a virtual dimensional body in a three-dimensional space into information on a two-dimensional plane by computation, to generate an image having a three-dimensional effect.

In one example, a rendering parameter is at least one selected from texture for the three-dimensional model of the recognition target, a shape of the three-dimensional model of the recognition target, a camera position for the three-dimensional model of the recognition target, a camera orientation for the three-dimensional model of the recognition target, a camera viewing angle for the three-dimensional model of the recognition target, an illumination condition for the three-dimensional model of the recognition target, a background three-dimensional model, a masking ratio, a storage condition of the teacher image, and others.

In another example, the rendering parameter is at least one selected from the texture for the three-dimensional model of the recognition target, the shape of the three-dimensional model of the recognition target, the illumination condition for the three-dimensional model of the recognition target, the background three-dimensional model, the masking ratio, the storage condition of the teacher image, and others.

EMBODIMENTS

In following embodiments, the "image processing apparatus" of the disclosure will be specifically described, but the disclosure is not limited to the embodiments.

Embodiment 1

(Image Processing Apparatus)

An image processing apparatus in Embodiment 1 will be described below. The image processing apparatus serves to recognize an image using teacher data of a recognition target.

FIG. 1 is a view illustrating hardware configuration of an image processing apparatus 100. A below-mentioned storage device 7 of the image processing apparatus 100 stores an image processing program therein, and below-mentioned central processing unit (CPU) 1 and graphics processing unit (GPU) 3 read and executes the program, thereby operating as a parameter change unit 10, a teacher data generation unit 50, a learning unit 200, and an inference unit 300.

The image processing apparatus 100 in FIG. 1 includes the CPU 1, a Random access memory (RAM) 2, the GPU 3, and a video random access memory (VRAM) 4. The image processing apparatus 100 includes a monitor 6 and the storage device 7.

The CPU 1 is a unit that executes various programs of the teacher data generation unit 50, the learning unit 200, and the inference unit 300, which are stored in the storage device 7.

The RAM 2 is a volatile memory, and includes a dynamic random access memory (DRAM), a static random access memory (SRAM) and the like.

The GPU 3 is a unit that executes computation for rendering 3DCG in the parameter change unit 10 and the teacher data generation unit 50.

The VRAM 4 is a memory area that holds data for displaying an image on a display such as a monitor, and is also referred to as graphic memory or video memory. The VRAM 4 may be a dedicated dual port, or use the same DRAM or SRAM as a main memory.

The monitor 6 is used to confirm teacher data generated by the teacher data generation unit 50. When the teacher data may be confirmed from another terminal connected thereto via a network, the monitor 6 is unnecessary.

The storage device 7 is an auxiliary computer-readable storage device that records various programs installed in the image processing apparatus 100 and data generated by executing the various programs.

The image processing apparatus 100 includes, although not illustrated, a graphic controller, input/output interfaces such as a keyboard, a mouse, a touch pad, and a track ball, and a network interface for connection to the network.

Figure 2:
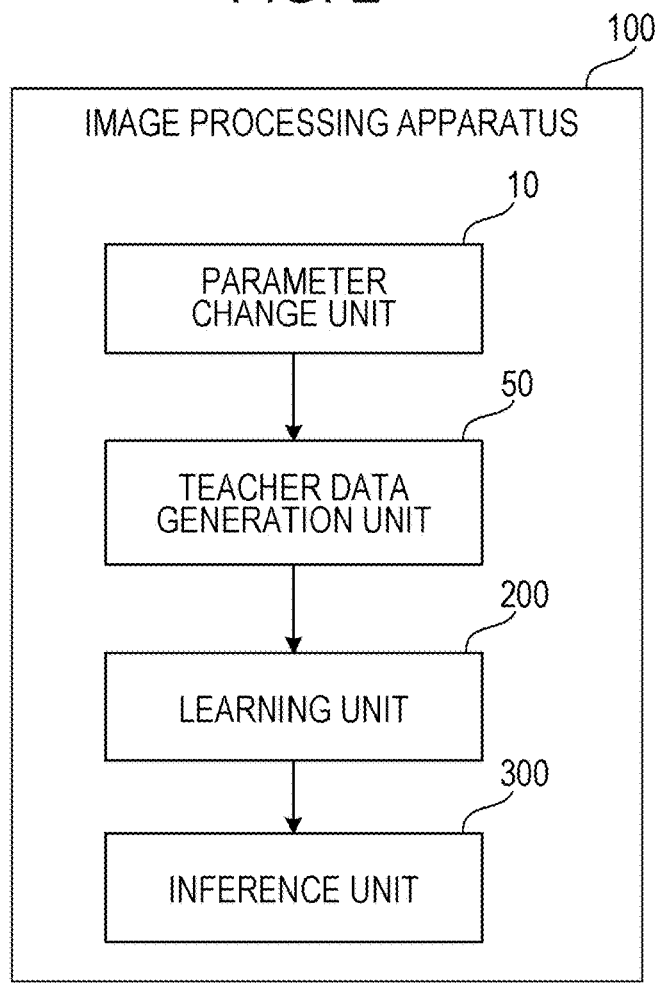
FIG. 2 is a block diagram illustrating an example of the entire image processing apparatus.

FIG. 2 is a block diagram illustrating an example of the entire image processing apparatus. The image processing apparatus 100 in FIG. 2 includes the parameter change unit 10, the teacher data generation unit 50, the learning unit 200, and the inference unit 300.

The parameter change unit 10 changes a rendering parameter in a three-dimensional model of the recognition target.

The teacher data generation unit 50 generates teacher data of the recognition target based on the rendering parameter changed by the parameter change unit 10.

The learning unit 200 performs learning using the teacher data generated by the teacher data generation unit 50.

The inference unit 300 performs inference (test) using a learned weight found by the learning unit 200.

Figure 3:
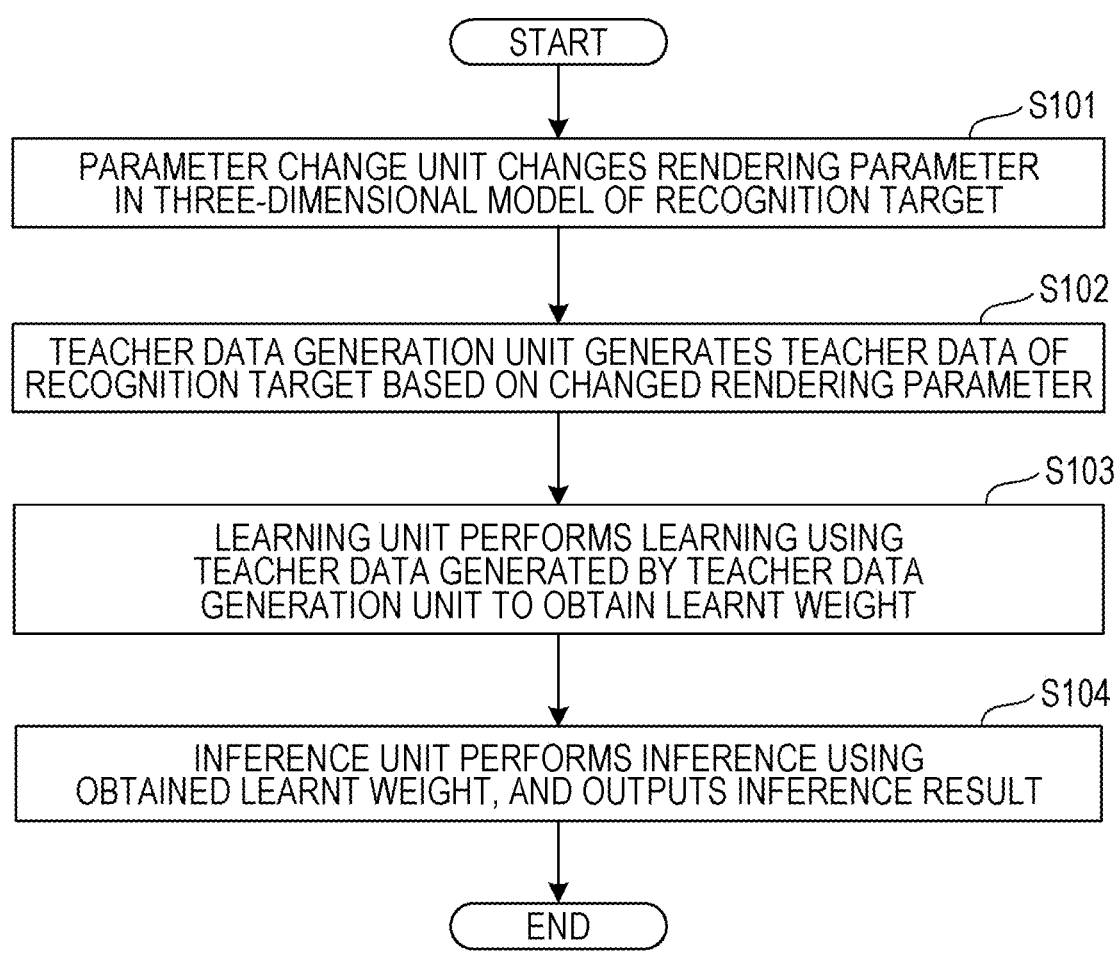
FIG. 3 is a flow chart illustrating an example of processing of the entire image processing apparatus.

FIG. 3 is a flow chart illustrating an example of the flow of processing of the entire image processing apparatus. Referring to FIG. 2, the flow of processing of the entire image processing apparatus will be described below.

In step S101, the parameter change unit 10 changes the rendering parameter in the three-dimensional model of the recognition target, the processing then proceeds to step S102.

In step S102, the teacher data generation unit 50 generates the teacher data of the recognition target based on the rendering parameter changed by the parameter change unit 10, the processing then proceeds to step S103.

In step S103, the learning unit 200 performs learning using the teacher data generated by the teacher data generation unit 50 to find a learned weight, the processing then proceeds to step S104.

In step S104, the inference unit 300 performs inference using the found learned weight and outputs an inference label (inference result) and processing is terminated.

The parameter change unit 10, the teacher data generation unit 50, the learning unit 200, and the inference unit 300 in the image processing apparatus 100 will be specifically described below.

<Parameter Change Unit and Teacher Data Generation Unit>

The parameter change unit 10 changes the rendering parameter in a recognition target 3D model.

The teacher data generation unit 50 generates teacher data of the recognition target based on the changed rendering parameter in the recognition target 3D model.

Configuration of the parameter change unit 10 and the teacher data generation unit 50 corresponds to the "teacher data generation apparatus" of the disclosure, processing of the parameter change unit 10 and the teacher data generation unit 50 corresponds to the "teacher data generation method" of the disclosure, and a program that causes a computer to execute processing of the parameter change unit 10 and the teacher data generation unit 50 corresponds to the "teacher data generation program" of the disclosure.

To improve the image recognition rate, a large quantity of teacher data is used. However, for example, in the case where there is only a large quantity of similar teacher data (image) such as human's profiles, even if the profiles may be recognized, forward-facing faces and rearward-facing faces may not be recognized. Since human may be recognized by his/her face as well as whole body, an image in which a part of the body is hidden is effective for improving the recognition rate. Therefore, to improve the recognition rate, it is important to increase the number of pieces of teacher data as well as variations of the teacher data.

In an image classification task, a pair of teacher image and correct classification (hereinafter also referred to as "label", "class", or "category") is provided as teacher data. In Embodiment 1, the pair of teacher data and correct answer is generated using 3DCG. In practice, another embodiment using teacher data (Object Detection, Semantic Segmentation, and so forth) in a task other than the image classification task is possible. In Embodiment 1, various rendering parameters are randomly generated. It is due to that, when a combination of parameters is collected at regular intervals, the number pf pieces of teacher data explosively increases.

Figure 4:
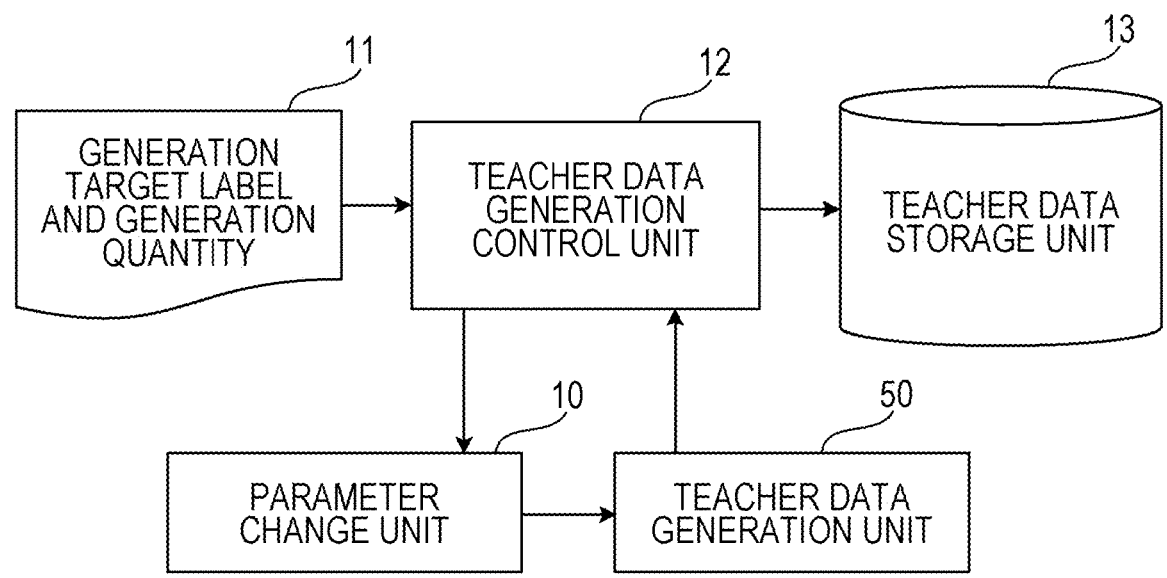
FIG. 4 is a block diagram illustrating an example of a parameter change unit and a teacher data generation unit.

FIG. 4 is a block diagram illustrating an example of the parameter change unit and the teacher data generation unit.

A generation target label and generation quantity 11 is "generation target label" and "generation quantity" inputted by the user, and a teacher data generation control unit 12 generates teacher data having the quantity of "generation quantity".

The "generation target label" refers to the type of the generation target, and includes, for example, automobiles (for example, family car, truck, bus, bicycle), animals (for example, bird, dog, cat, cow, horse, and monkey), plants (for example, strawberry, tomato, rose), and other objects viewable to human.

The "generation quantity" refers to the number of pieces of generated teacher data, and for example, 1000 pieces of teacher data are generated for each of a plurality of "generation target labels".

The teacher data generation control unit 12 functions to cause the teacher data generation unit 50 to execute processing based on the "generation target label" and the "generation quantity", which are inputted in the generation target label and generation quantity 11 by the user, and store the generated teacher data in a teacher data storage unit 13.

The parameter change unit 10 functions to change the rendering parameter in the recognition target 3D model based on the inputted "generation target label", and output the changed rendering parameter to the teacher data generation unit 50.

The teacher data generation unit 50 functions to generate one pair of teacher data of the inputted "generation target label". The teacher data is configured of a pair of "input data" and "correct label". Here, the "input data" is referred to as "teacher image".

The teacher data storage unit 13 stores the teacher data generated by the teacher data generation unit 50, and is, for example, an auxiliary storage device such as the storage device 7 illustrated in FIG. 1.

Figure 5:
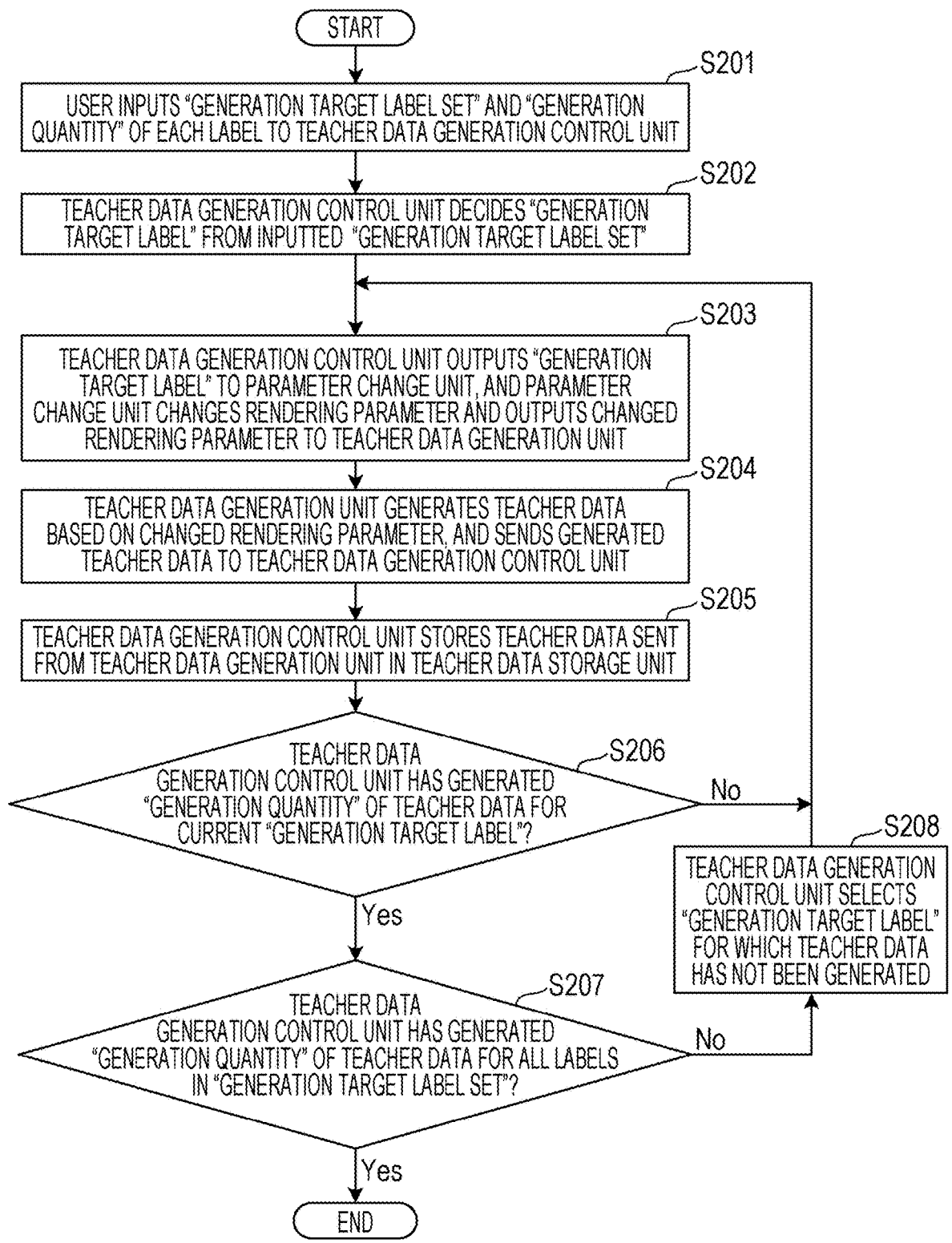
FIG. 5 is a flow chart illustrating an example of the flow of processing of the parameter change unit and the teacher data generation unit.

FIG. 5 is a flow chart illustrating an example of the flow of processing of the parameter change unit and the teacher data generation unit. Referring to FIG. 4, the flow of the processing of the parameter change unit and the teacher data generation unit will be described below.

In step S201, the user inputs "a generation target label set" and "generation quantity" of each label to the teacher data generation control unit 12 to the teacher data generation control unit 12, the processing then proceeds to step S202.

In step S202, the teacher data generation control unit 12 randomly decides the "generation target label" from the inputted "generation target label set", the processing then proceeds to step S203.

In step S203, the teacher data generation control unit 12 outputs the "generation target label" to the parameter change unit 10, and the parameter change unit 10 changes the rendering parameter in the recognition target 3D model, and outputs the changed rendering parameter to the teacher data generation unit 50, the processing then proceeds to step S204.

In step S204, the teacher data generation unit 50 generates the teacher data based on the rendering parameter changed by the parameter change unit 10, and sends the generated teacher data to the teacher data generation control unit 12, the processing then proceeds to step S205.

In step S205, the teacher data generation control unit 12 stores the teacher data sent from the teacher data generation unit 50 in the teacher data storage unit 13, the processing then proceeds to step S206.

In step S206, it is determined whether or not the teacher data generation control unit 12 has generated the "generation quantity" of teacher data for the current "generation target label" 11.

When it is determined that the teacher data generation control unit 12 has not generated the "generation quantity" of teacher data, the processing returns to step S203. When it is determined that the teacher data generation control unit 12 has generated the "generation quantity" of teacher data", the processing proceeds to step S207.

In step S207, it is determined whether or not the teacher data generation control unit 12 has generated the "generation quantity" of teacher data for all labels in the "generation target label set".

When it is determined that the teacher data generation control unit 12 has not generated the "generation quantity" of teacher data for all labels in the "generation target label set", the processing proceeds to step S208. In step S208, the teacher data generation control unit 12 selects the "generation target label" for which the teacher data has not been generated, the processing then returns to step S203.

When it is determined that the teacher data generation control unit 12 has generated the "generation quantity" of teacher data, processing is terminated.

Figure 6:
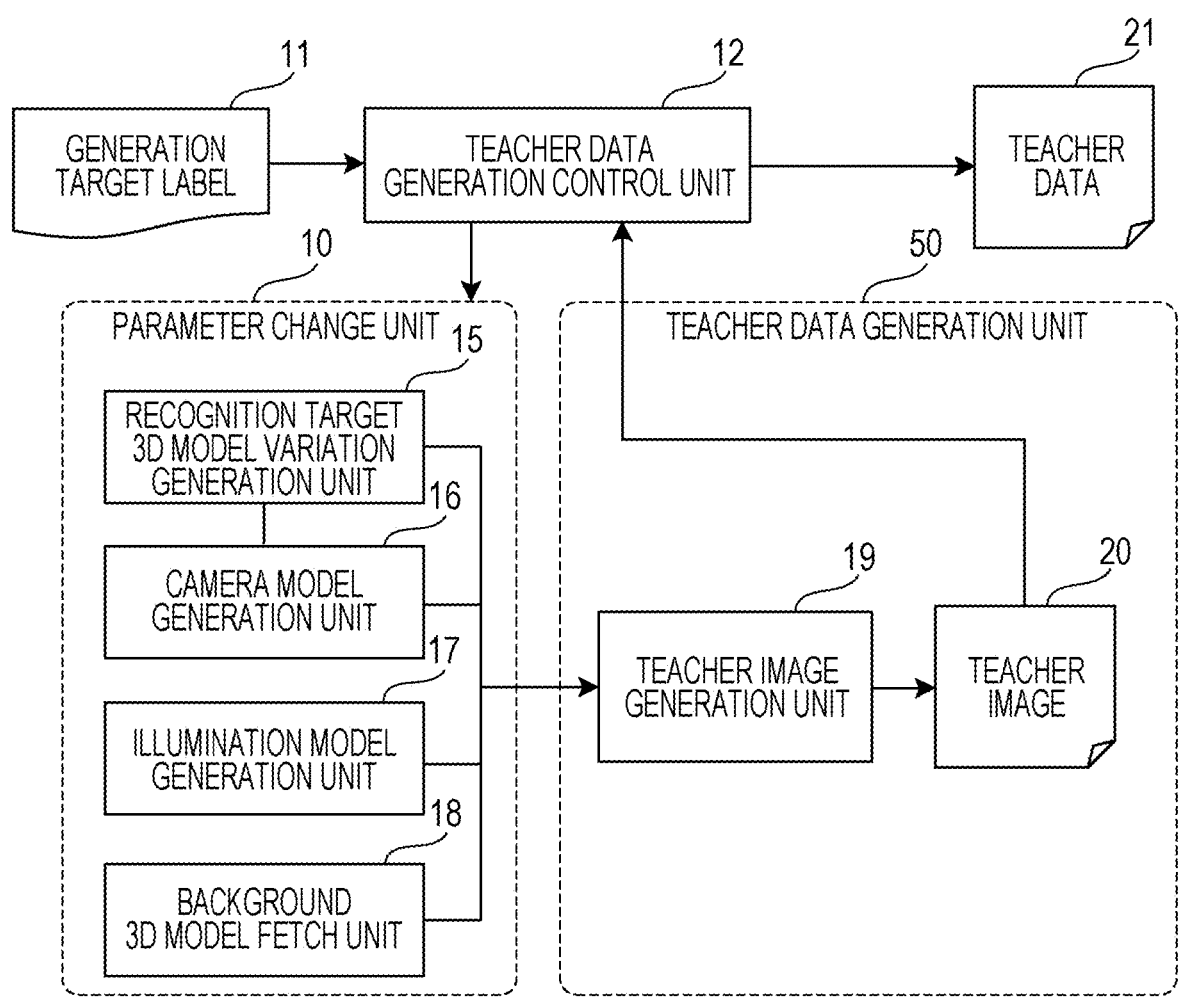
FIG. 6 is a block diagram illustrating another example of the parameter change unit and the teacher data generation unit.

FIG. 6 is a block diagram illustrating an example of the parameter change unit 10 and the teacher data generation unit 50.

The parameter change unit 10 includes a recognition target 3D model variation generation unit 15, a camera model generation unit 16, an illumination model generation unit 17, and a background 3D model fetch unit 18, and changes the rendering parameter using these units.

The teacher data generation unit 50 includes a teacher image generation unit 19, and generates teacher data 21 under control of the teacher data generation control unit 12 based on the rendering parameter changed by the parameter change unit 10.

The generation target label 11 is a parameter inputted to the teacher data generation control unit 12, and the teacher data generation unit 50 generates the teacher data on the generation target label 11 inputted by the user.

The teacher data generation control unit 12 operates the recognition target 3D model variation generation unit 15, the camera model generation unit 16, the illumination model generation unit 17, and the background 3D model fetch unit 18, as the parameter change unit 10, and provides their outputs to the teacher image generation unit 19 of the teacher data generation unit 50, to find a teacher image 20.

The recognition target 3D model variation generation unit 15 changes at least either texture or shape of the recognition target 3D model. The recognition rate is improved by changing at least either the texture or shape.

The camera model generation unit 16 changes at least one of a camera position, a camera orientation, and a camera viewing angle for the three-dimensional model of the recognition target to generate a camera model.

The illumination model generation unit 17 randomly provides parameters of various light sources to generate an illumination model. Examples of the light sources include parallel light source, point light source, and ambient light.

The background 3D model fetch unit 18 randomly obtains a background 3D model other than the recognition target 3D model.

The teacher image generation unit 19 generates a teacher image suited for teacher data in deep learning from an output from the recognition target 3D model variation generation unit 15, the camera model generation unit 16, the illumination model generation unit 17, or the background 3D model fetch unit 18. Generation of the teacher image may fail depending on the combination of the background 3D model and a camera model. When generation of the teacher image fails, the camera model is recalculated.

Figure 7:
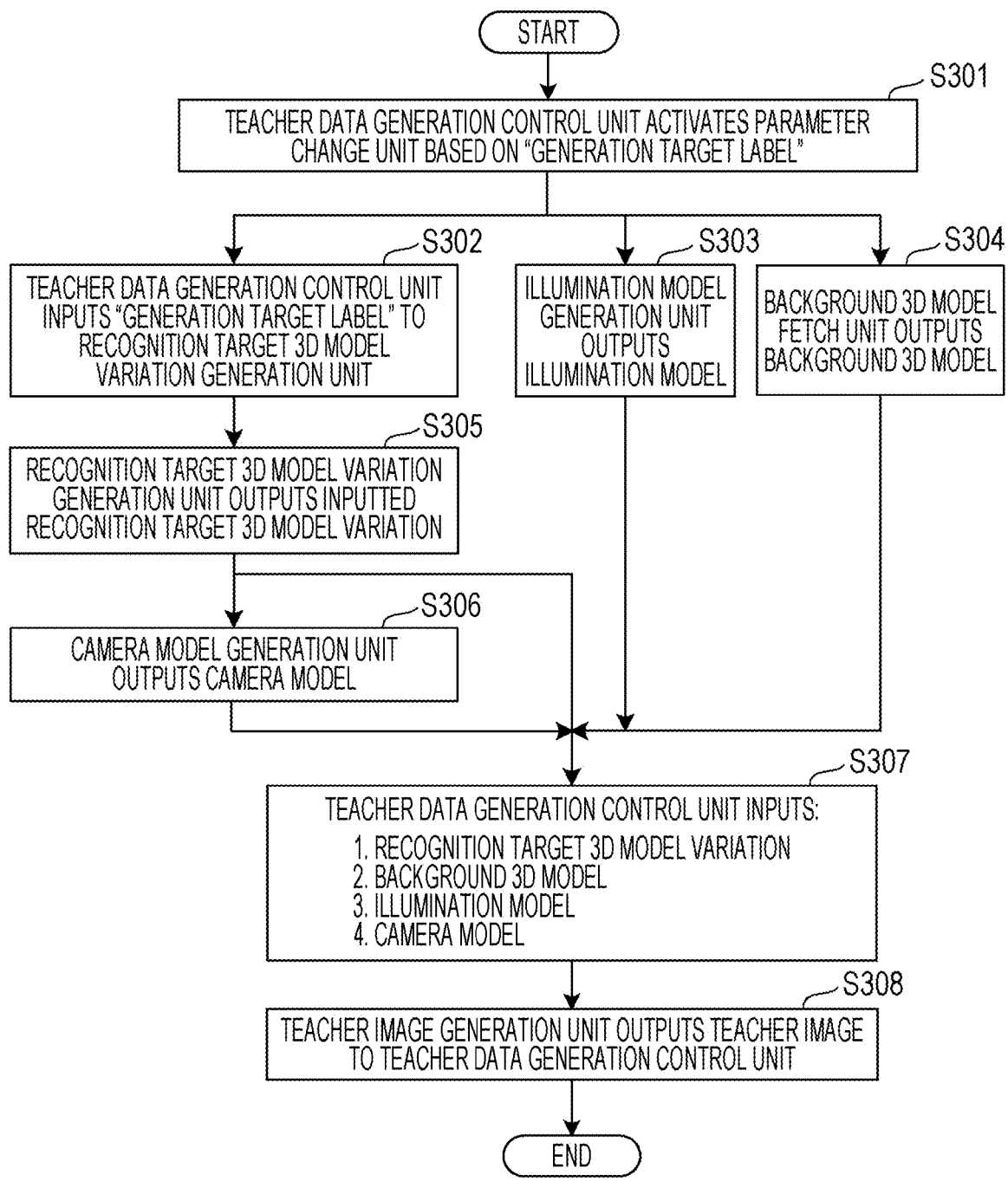
FIG. 7 is a flow chart illustrating an example of the flow of processing of the parameter change unit and the teacher data generation unit.

FIG. 7 is a flow chart illustrating an example of the flow of processing of the parameter change unit and the teacher data generation unit. Referring to FIG. 6, the flow of the processing of the parameter change unit and the teacher data generation unit will be described below.

In step S301, the teacher data generation control unit 12 activates the parameter change unit 10 based on the generation target label 11, the processing then proceeds to steps S302, S303, and S304.

In step S302, the teacher data generation control unit 12 inputs the generation target label 11 to the recognition target 3D model variation generation unit 15, the processing then proceeds to step S305.

In step S303, the illumination model generation unit 17 outputs the illumination model, the processing then proceeds to step S307.

In step S304, when the background 3D model fetch unit 18 outputs the background 3D model, the processing proceeds to step S307.

In step S305, the recognition target 3D model variation generation unit 15 outputs a recognition target 3D model variation based on the inputted generation target label 11, the processing then proceeds to steps S306 and S307. Namely, both of steps S306 and S307 are processed.

In step S306, the camera model generation unit 16 outputs the camera model, the processing then proceeds to step S307.

In step S307, the teacher data generation control unit 12 inputs the recognition target 3D model variation, the camera model, the illumination model, and the background 3D model to the teacher image generation unit 19, the processing then proceeds to step S308.

In step S308, the teacher image generation unit 19 generates teacher image, and outputs the generated teacher image to the teacher data generation control unit 12 and processing is terminated.

<Recognition Target 3D Model Variation Generation Unit>

The recognition target 3D model variation generation unit 15 changes at least either texture or shape of the 3D model used for rendering the teacher image. The recognition rate is improved by changing at least either the texture or shape of the 3D model.

Figure 8:
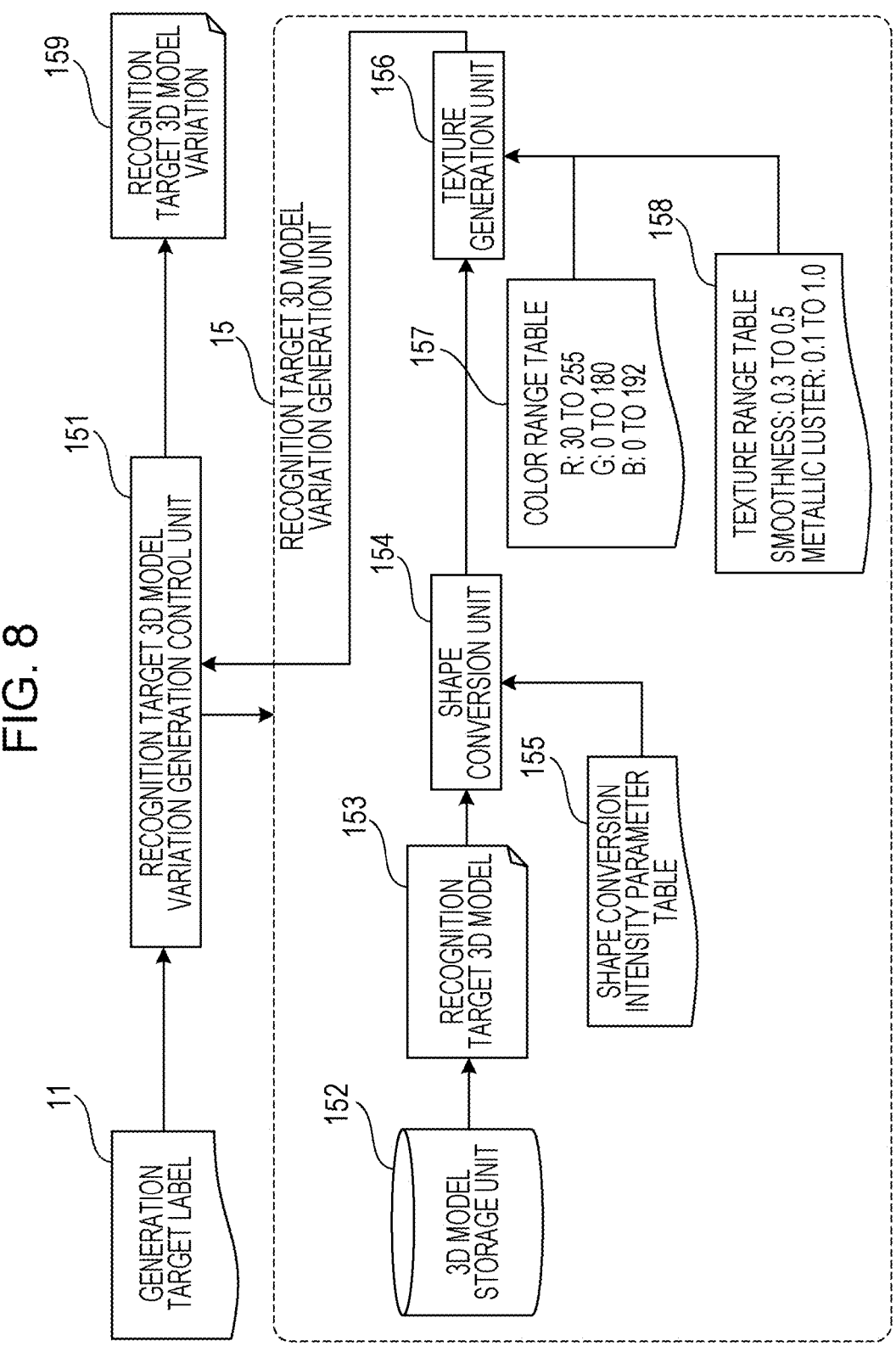
FIG. 8 is a block diagram illustrating an example of a recognition target 3D model variation generation unit.

FIG. 8 is a block diagram illustrating the recognition target 3D model variation generation unit 15. The recognition target 3D model variation generation unit 15 in FIG. 8 receives an input of the generation target label 11 from the user, and outputs a recognition target 3D model variation 159.

The recognition target 3D model variation 159 is obtained by processing a recognition target 3D model 153 in the recognition target 3D model variation generation unit 15.

A 3D model storage unit 152 stores the recognition target 3D model 153. The recognition target 3D model 153 is associated with "label information" on the generation target label 11 inputted by the user. The "label information" represents what the generated recognition target 3D model is to be recognized as by deep learning.

The recognition target 3D model 153 is a 3D model on which teacher data is based. The recognition target 3D model 153 has a general 3D model format, but is special in a following point. The 3D model is changed in shape by a shape conversion unit 154, and in texture by a texture generation unit 156. However, in the case of the conversion of an automobile 3D model in shape, actually, an elliptical automobile tire does not exist, and an opaque windshield does not practically exist. Accordingly, in the recognition target 3D model, it is desirable to control which part of the recognition target 3D model the shape conversion unit 154 and the texture generation unit 156 affects or do not affect. Such information is given as meta information on the recognition target 3D model.

The recognition target 3D model is deformed within the range of a shape conversion intensity parameter table 155. The recognition target 3D model is not wholly deformed, and only the part designated based on the meta information assigned to the recognition target 3D model is deformed. The recognition target 3D model is deformed as follows.

(1) Shear: Shear is made in a random size within the range of the shape conversion intensity parameter table 155 along a random vector.

(2) Extension and contraction: At least either extension or contraction is made within the range of the shape conversion intensity parameter table 155.

The shape conversion intensity parameter table 155 is a parameter for designating the intensity of deformation of the shape conversion unit 154, and is, for example, a value designated by the user.

The texture generation unit 156 generates texture based on a color range table 157 and a texture range table 158, and the texture to the recognition target 3D model. The texture of the entire recognition target 3D model is not set, and the texture for only the part designated based on meta information assigned to the recognition target 3D model is set.

The color range table 157 is a parameter for designating the range of color of the texture for the 3D model, which is generated by the texture generation unit 156, and is a user-designated value. The color range table 157 may designate any range of integers from 0 to 255 for each of three RGB channels. In Embodiment 1, for example, 30 to 255 is set to R, 0 to 180 is set to G, and 0 to 192 is set to B.

The texture range table 158 is a parameter for designating at least either smoothness or metallic luster of the texture for the 3D model, which is generated by the texture generation unit 156, and is a user-designated value. The texture range table 158 may designate any range of floating points from 0.0 to 1.0. In Embodiment 1, for example, 0.3 to 0.5 is set to smoothness, and 0.1 to 1.0 is set to metallic luster.

Figure 9:
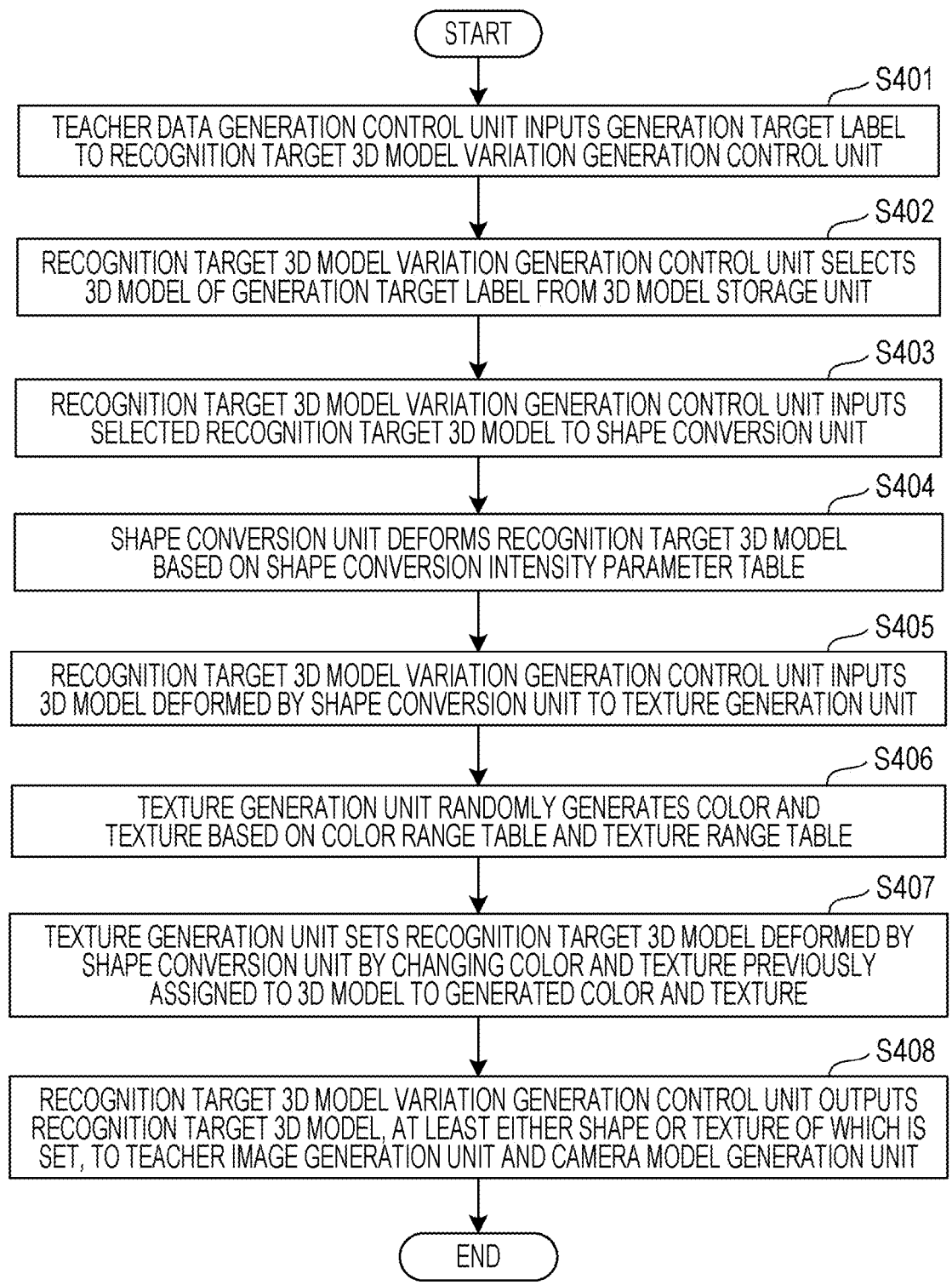
FIG. 9 is a flow chart illustrating an example of the flow of processing of the recognition target 3D model variation generation unit.

FIG. 9 is a flow chart illustrating an example of the flow of processing of the recognition target 3D model variation generation unit. Referring to FIG. 8, the flow of processing of the recognition target 3D model variation generation unit will be described below.

In step S401, the teacher data generation control unit 12 inputs the generation target label 11 inputted by the user to a recognition target 3D model variation generation control unit 151, the processing then proceeds to step S402.

In step S402, recognition target 3D model variation generation control unit 151 randomly selects the 3D model of the inputted generation target label from the 3D model storage unit 152, the processing then proceeds to step S403.

In step S403, the recognition target 3D model variation generation control unit 151 inputs the selected recognition target 3D model 153 to the shape conversion unit 154, the processing then proceeds to step S404.

In step S404, the shape conversion unit 154 deforms the recognition target 3D model 153 based on the shape conversion intensity parameter table 155, the processing then proceeds to step S405.

In step S405, the recognition target 3D model variation generation control unit 151 inputs the recognition target 3D model deformed by the shape conversion unit 154 to the texture generation unit 156, the processing then proceeds to step S406.

In step S406, the texture generation unit 156 randomly generates color and texture based on the color range table 157 and the texture range table 158, the processing then proceeds to step S407.

In step S407, the texture generation unit 156 sets, on the recognition target 3D model deformed by the shape conversion unit 154, color and texture previously assigned to the recognition target 3D model to the generated color and texture, the processing then proceeds to step S408.

In step S408, the recognition target 3D model variation generation control unit 151 outputs a recognition target 3D model variation, at least either shape or texture of which is set, to the teacher image generation unit 19 and the camera model generation unit 16 and processing is terminated.

<Camera Model Generation Unit>

The camera model generation unit 16 changes at least one of the camera position, the camera orientation, and the camera viewing angle for the three-dimensional model of the recognition target to generate a camera model.

Figure 10:
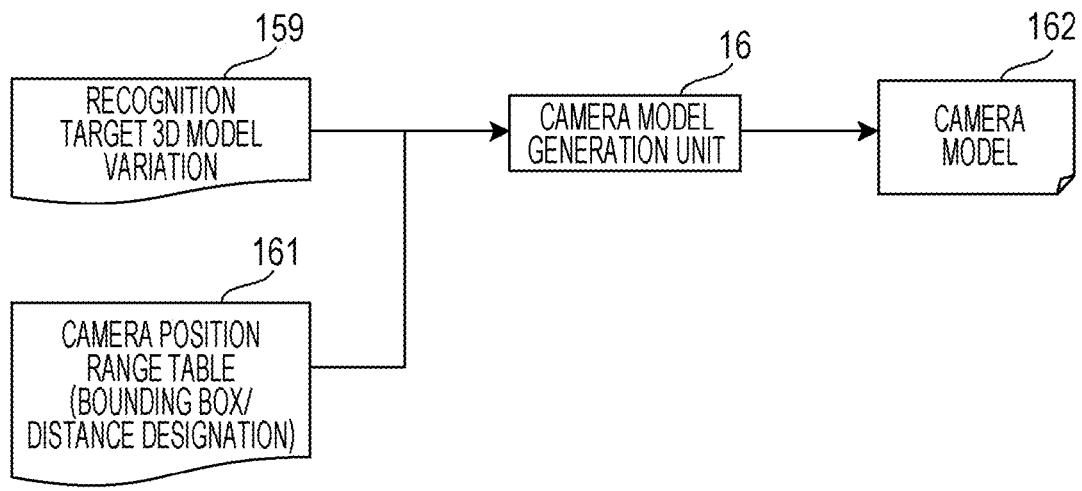
FIG. 10 is a block diagram illustrating an example of a camera model generation unit.

FIG. 10 is a block diagram illustrating an example of the camera model generation unit 16. In order for in the camera model generation unit 16 in FIG. 10 to generate teacher data suitable for deep learning, it is desirable to ensure rendering such that the generated teacher data may be correctly classified. For this reason the camera model is generated considering that the recognition target 3D model is rendered with a suitable size.

The camera position and the camera orientation may be decided by a simple vector calculation such that the camera may reliably capture the recognition target 3D model.

The camera viewing angle is particularly considered as described below.

Figure 11:
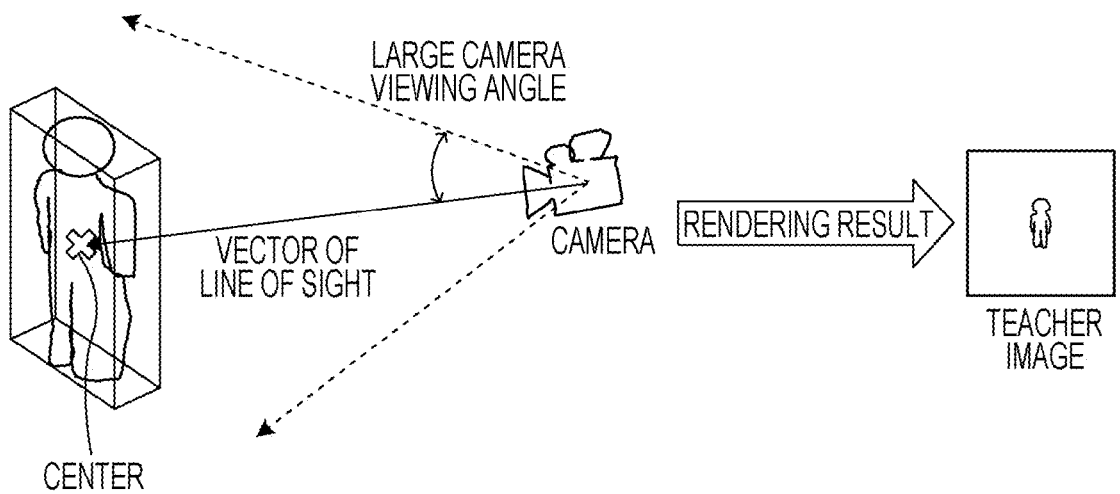
FIG. 11 is a view for explaining that, when the camera viewing angle is too large, the recognition target 3D model in a teacher image is rendered small.
Figure 12:
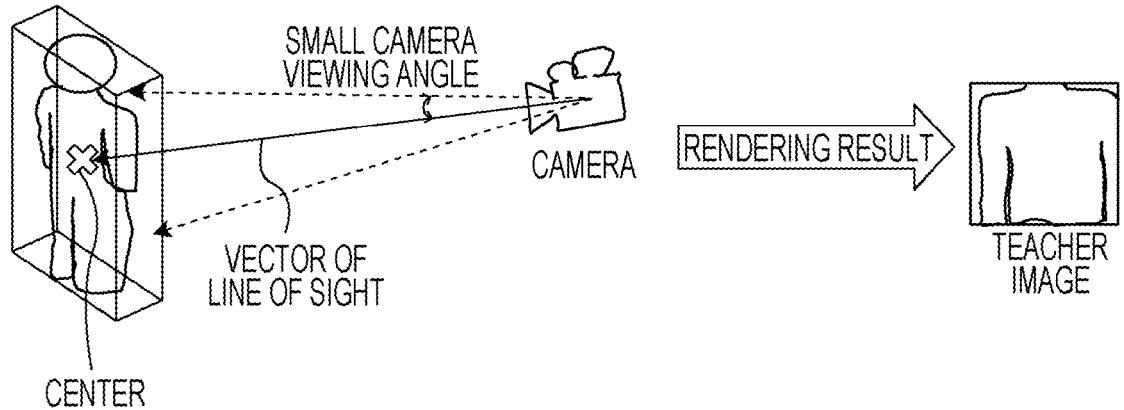
FIG. 12 is a view for explaining that, when the camera viewing angle is too small, the recognition target 3D model in the teacher image is rendered large.

FIGS. 11 and 12 are views for describing what teacher image is generated in the case where the camera viewing angle is too large or too small while the camera captures the recognition target 3D model.

As illustrated in FIG. 11, when camera viewing angle is too large, the recognition target 3D model in the teacher image is rendered small. Meanwhile, as illustrated in FIG. 12, when the camera viewing angle is too small, the recognition target 3D model in the teacher image is rendered large, and only a part of the recognition target 3D model is rendered.

Figure 13:
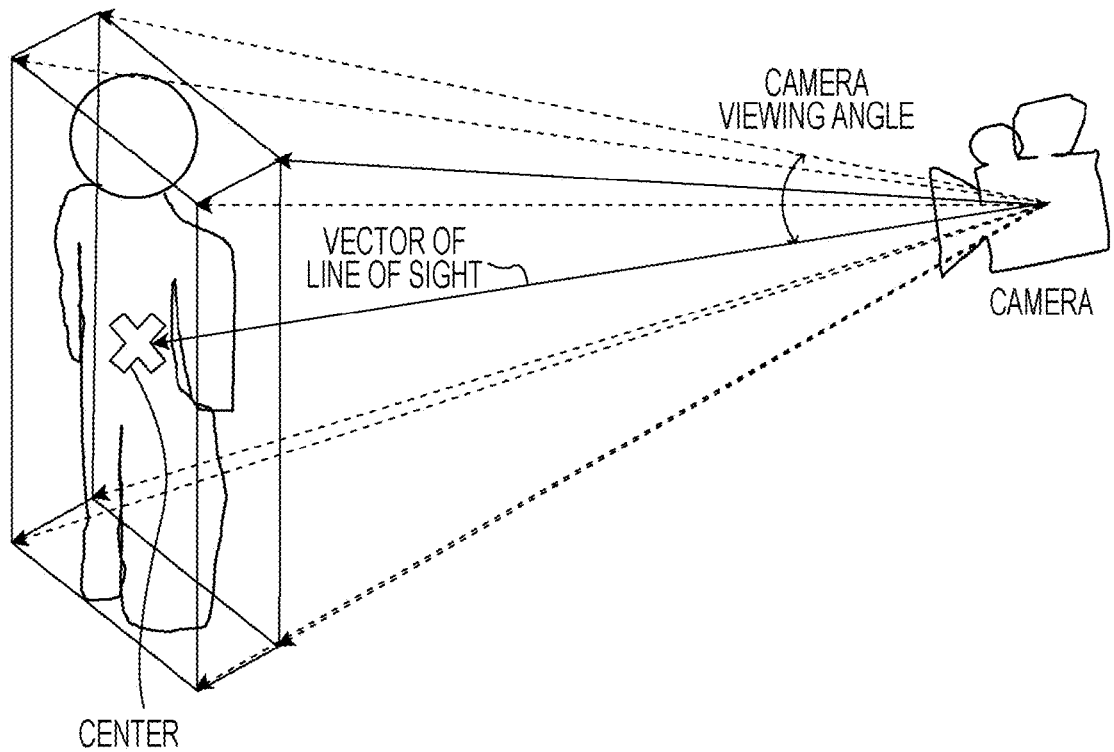
FIG. 13 is a view illustrating an example of a method of deciding the angle of view in the camera model generation unit.

Referring to FIG. 13, the camera viewing angle is found as follows.

(1) The camera position is decided by calculating a random position in a camera position range table 161 (bounding box/distance designation) designated by the user. The bounding box is the rectangular box enveloping the recognition target (e.g., a human body) in FIG. 13.

(2) The camera orientation is decided by calculating the orientation facing the center of the bounding box of the recognition target 3D model from a temporary camera position. Accordingly, a vector of the camera's line of sight passes though the center of the recognition target 3D model.

(3) An angle that the vector of the camera's line of sight forms with a vector from the camera to each of apexes of the recognition target 3D model is found, and the maximum angle is set to the camera viewing angle.

Figure 14:
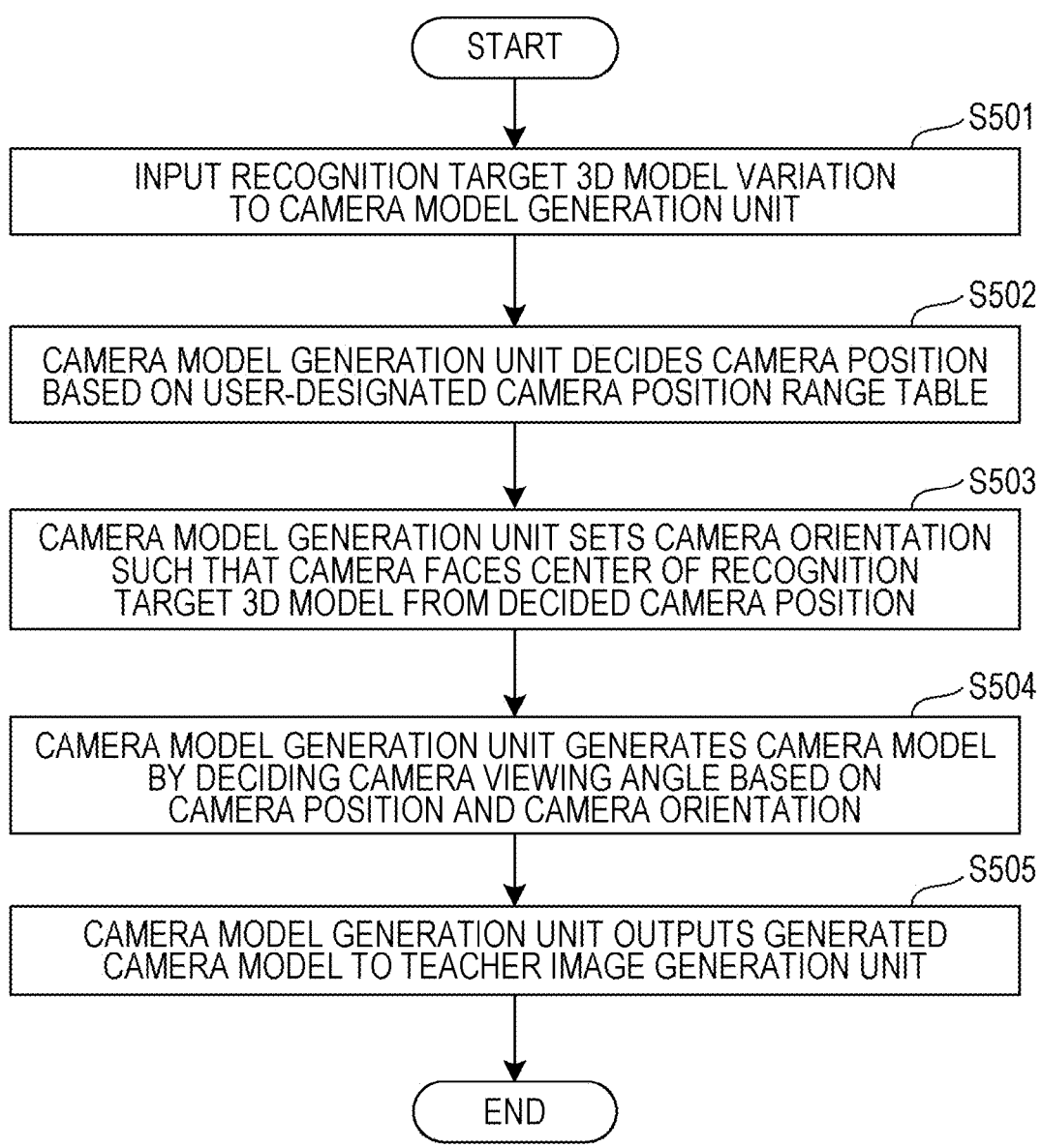
FIG. 14 is a flow chart illustrating an example of the flow of processing of the camera model generation unit.

FIG. 14 is a flow chart illustrating an example of the flow of processing of the camera model generation unit. Referring to FIGS. 10 to 13, the flow of processing of the camera model generation unit will be described below.

In step S501, the recognition target 3D model variation generation control unit 151 inputs the recognition target 3D model variation 159 to which shape or texture is set to the camera model generation unit 16, the processing then proceeds to step S502.

In step S502, the camera model generation unit 16 decides the camera position based on the user-designated camera position range table 161, the processing then proceeds to step S503.

In step S503, the camera model generation unit 16 sets the camera orientation to the orientation where the camera faces the center of the recognition target 3D model from the decided camera position, the processing then proceeds to step S504.

In step S504, the camera model generation unit 16 decides the camera viewing angle based on the camera position and the camera orientation to generate a camera model 162, the processing then proceeds to step S505.

In step S505, the camera model generation unit 16 outputs the generated camera model 162 to the teacher image generation unit 19 and processing is terminated.

<Illumination Model Generation Unit>

The illumination model generation unit 17 sets a light source in a three dimensional (3D) space, thereby generating an illumination model of the recognition target 3D model. Setting the light source makes the 3D model visible. Examples of the light source include parallel light source, point light source, ambient light.

The parallel light source simulates light from infinity. For example, sunlight almost looks like the parallel light source. Unlike the point light source, the parallel light source emits light having a fixed intensity.

In the parallel light source, for example, angle, intensity, color (the user-designated color temperature (ex. 4000K to 6000K)), number (0 or 1) are randomly set.

The point light source such as electric bulb and spotlight emits light from one point to all directions. The light intensity decreases with distance from the light source.

In the point light source, for example, position, intensity, color (for each of RGB, width is designated in units of 8 bit, 0 to 255 at largest), number (0 to user-designated value) are randomly set.

The ambient light uniformly lightens all objects, and simulates indirect light. The intensity of light from all directions may be simulated. For example, since it is impractical to randomly generate ambient light, some variations are stored in an ambient light high dynamic range (HDR) map storage unit, and are randomly blended to generate ambient light to be rendered.

The ambient light HDR map storage unit stores a part other than the recognition target, that is, sky (sky color, cloud, brightness) in background. An ambient light HDR map is a bitmap file that indicates the intensity of light from all directions.

<Background 3D Model Fetch Unit>

The background 3D model fetch unit 18 randomly fetches a background 3D model from a background 3D model storage unit. Examples of the background 3D model include urban landscapes such as streets, buildings, and roads, and natural landscapes such as sea, trees, rivers, and mountains.

The background 3D model storage unit stores a background 3D model of a part other than the recognition target, that is, a part other than sky (for example, sky color, cloud, and brightness) in background other than the recognition target. The sky is not designated because the sky is formed using ambient light.

In order to exclude the background 3D models from the learning by deep learning, it is desirable to prepare sufficient variations or a generation mechanism. To ensure image recognition, it is preferable to use the background 3D model that partially masks the recognition target 3D model.

<Teacher Image Generation Unit>

Figure 15:
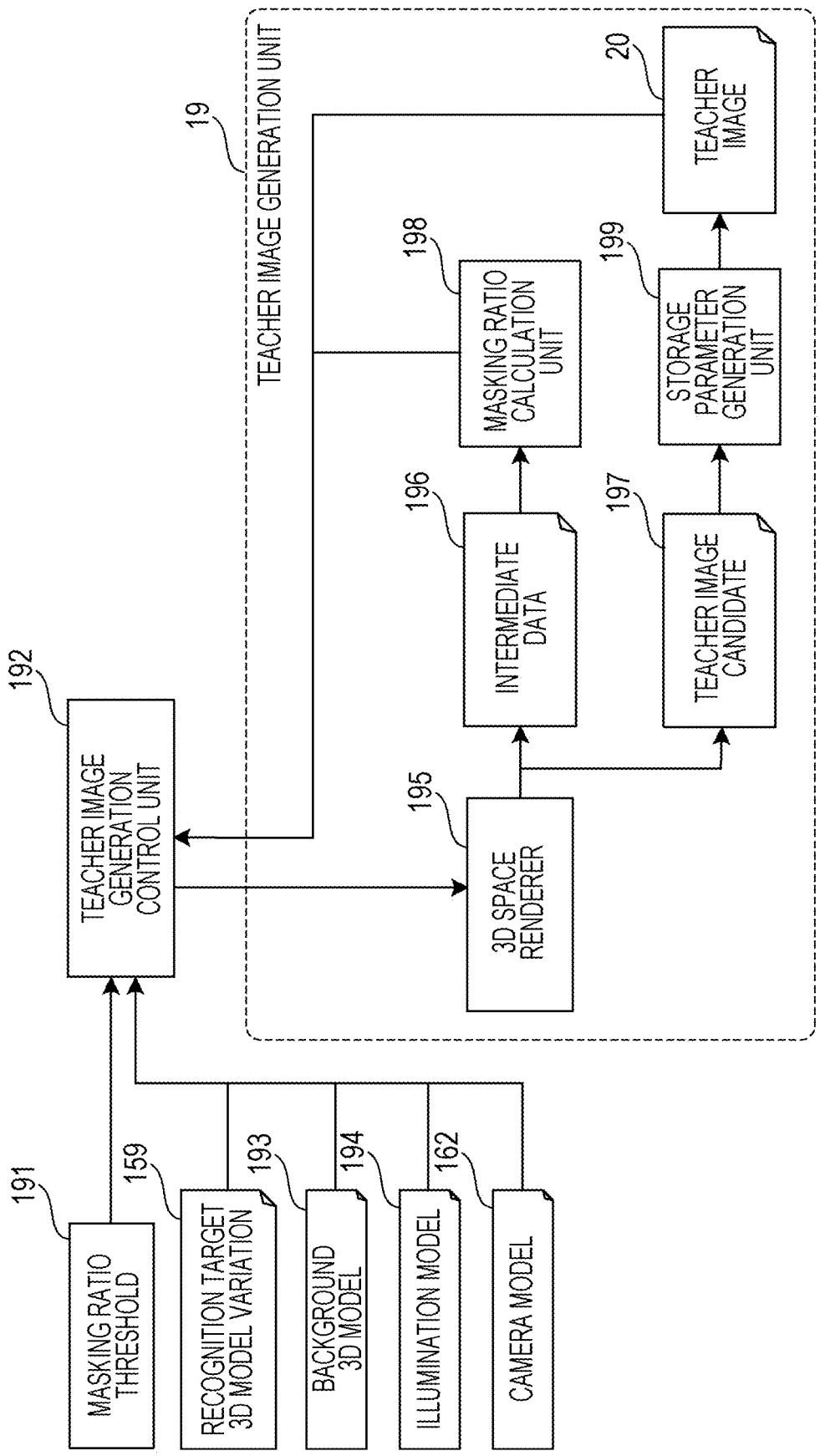
FIG. 15 is a block diagram illustrating an example of a teacher image generation unit.

As illustrated in FIG. 15, the teacher image generation unit 19 is controlled by a teacher image generation control unit 192, and includes a 3D space renderer 195, a masking ratio calculation unit 198, and a storage parameter generation unit 199.

When a masking ratio threshold 191, the recognition target 3D model variation 159, a background 3D model 193, an illumination model 194, and the camera model 162 are inputted to the teacher image generation control unit 192, the teacher image generation control unit 192 outputs the teacher image 20 or an "error".

The masking ratio threshold 191 may be inputted by the user, or may be set for each class of the three-dimensional model of the recognition target. The masking ratio threshold 191 may be found by obtaining the masking ratio from big data and correlating results. This improves the recognition rate.

The teacher image 20 is an image corresponding to input data of teacher data.

The "error" represents that the masking ratio is too high, and generation of the teacher image used as the teacher data. In this case, retry is made at a higher level.

The 3D space renderer 195 is software that renders the three-dimensional (3D) space, and receives inputs of the recognition target 3D model variation 159, the background 3D model 193, the illumination model 194, and the camera model 162 to output intermediate data 196 and a teacher image candidate 197.

The intermediate data 196 is data inputted to the masking ratio calculation unit 198. The intermediate data 196 is image data having the same number of pixels as the teacher data image. Two images are rendered under the same rendering conditions as the teacher data image.

(1) Only the recognition target 3D model is rendered (binary image of 0, 1, 1 represents rendering target, 0 represents others; See A in FIG. 16).

(2) Both the recognition target 3D model and the background 3D model are rendered in consideration of masking (binary image of 0, 1, 1 represents rendering target, 0 represents others; See B in FIG. 16).

The teacher image candidate 197 is a candidate of the teacher image, and is generated into the teacher image 20 through the storage parameter generation unit 199 when the masking ratio of the recognition target 3D model, which is calculated by the masking ratio calculation unit 198, is a threshold or less.

The recognition target 3D model may be masked with the background 3D model 193 depending on results of the background 3D model 193 and the camera model 162. Such recognition target 3D model is undesirable as the teacher data and therefore is desirably removed. Meanwhile, it is known that the partially masked recognition target 3D model improves the robustness of the teacher data, and is suitable as teacher data.

Accordingly, it is determined whether or not the recognition target 3D model is sufficiently taken by the camera, and the model having the masking ratio that is equal to or smaller than the threshold is used as teacher data.

Figure 16:
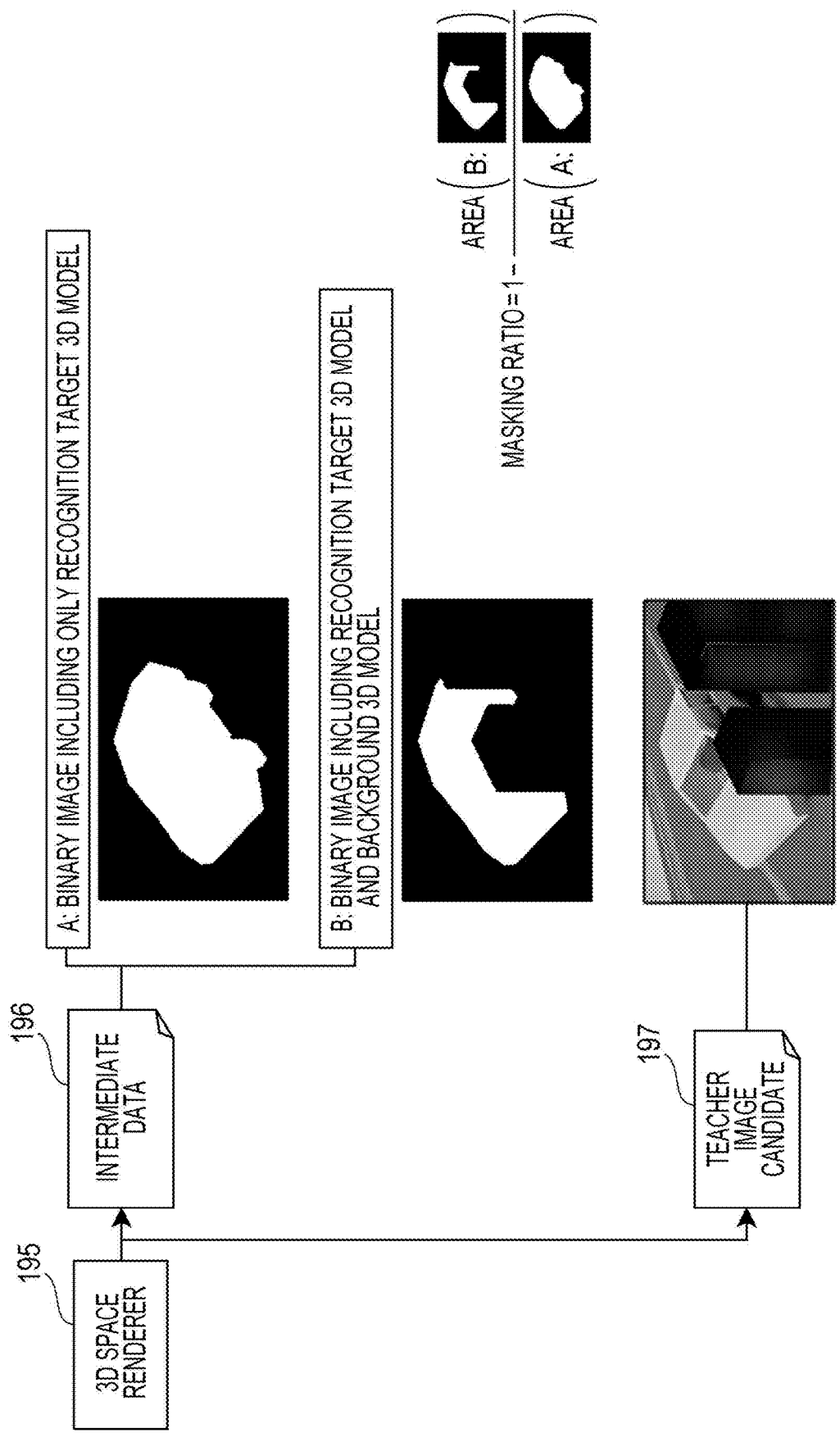
FIG. 16 is a view for describing a method of finding a masking ratio.

As illustrated in FIG. 16, the masking ratio may be calculated from the intermediate data 196 outputted from the 3D space renderer 195 by the masking ratio calculation unit 198 according to a following mathematical expression.

$$\text{MASKING RATIO} = 1 - \frac{f(B)}{f(A)} \quad (1)$$

However, in the expression, among the intermediate data outputted from the 3D space renderer 195, the binary image (1-A) including only the recognition target 3D model is A, and the binary image (1-B) including both the recognition target 3D model and the background 3D model is defined as B. f(x) is a function that returns area (the number of pixels) of 1 among binary images x. Here, the background means other than the recognition target, and may include something at foreground of the recognition target.

The storage parameter generation unit 199 decides a storage format and image quality of the teacher image, and randomly defines following parameters.

(1) Storage format . . . "jpg", "png"

(2) Image quality . . . In "jpg", storage quality may be set. In "png", the bit depth that defines the number of colors used per pixel may be designated.

Figure 17:
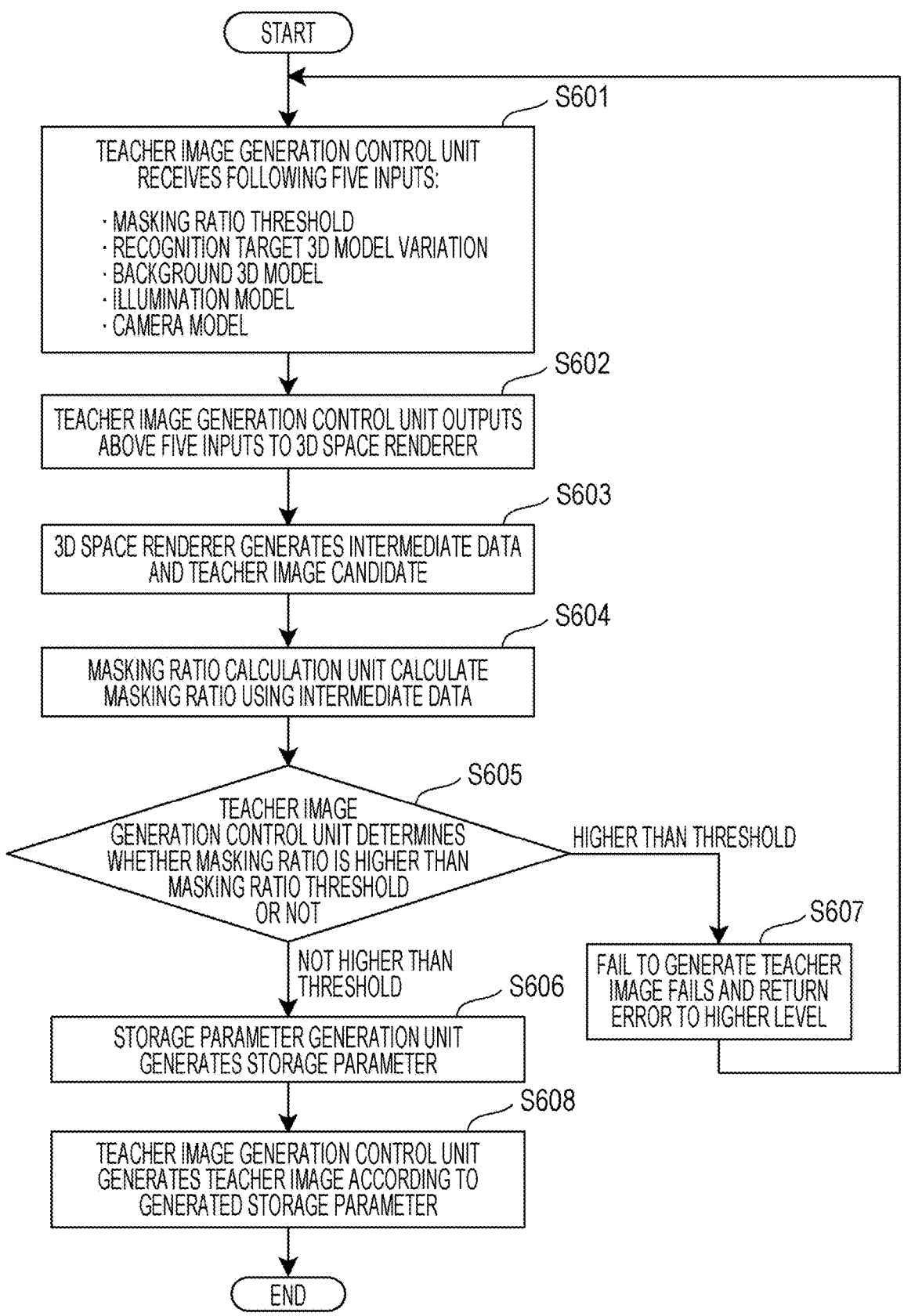
FIG. 17 is a flow chart illustrating an example of the flow of processing of the teacher image generation unit.

FIG. 17 is a flow chart illustrating the flow of processing of the teacher image generation unit. Referring to FIGS. 15 and 16, the flow of processing of the teacher image generation unit will be described below.

In step S601, the masking ratio threshold 191, the recognition target 3D model variation 159, the background 3D model 193, the illumination model 194, and the camera model 162 are inputted to the teacher image generation control unit 192, the processing then proceeds to step S602.

In step S602, the teacher image generation control unit 192 outputs the inputted masking ratio threshold 191, recognition target 3D model variation 159, background 3D model 193, illumination model 194, and camera model 162 to the 3D space renderer 195, the processing then proceeds to step S603.

In step S603, the 3D space renderer 195 generates the intermediate data 196 and the teacher image candidate 197, the processing then proceeds to step S604.

In step S604, the masking ratio calculation unit 198 calculates the masking ratio using the intermediate data 196, the processing then proceeds to step S605.

In step S605, the teacher image generation control unit 192 determines whether the masking ratio is higher than a masking ratio threshold, or is equal to or smaller than the masking ratio threshold.

When it is determined that the masking ratio is higher than the masking ratio threshold, the processing proceeds to step S607, generation of the teacher image fails, and an error is returned to the higher level. When it is determined that the masking ratio is equal to or smaller than the masking ratio threshold, the processing proceeds to step S606.

In step S606, storage parameter generation unit 199 randomly generates the storage parameters, the processing then proceeds to step S608.

In step S608, the teacher image generation control unit 192 generates the teacher image 20 according to the generated storage parameters and processing is terminated.

In this manner, teacher data that has a high robustness and a recognition rate comparable to that of the actually-taken teacher data may be obtained. The teacher data is suitably used in the below-mentioned learning unit and the inference unit.

<Learning Unit>

The learning unit 200 performs learning using the teacher data generated by the teacher data generation unit 50.

Figure 18:
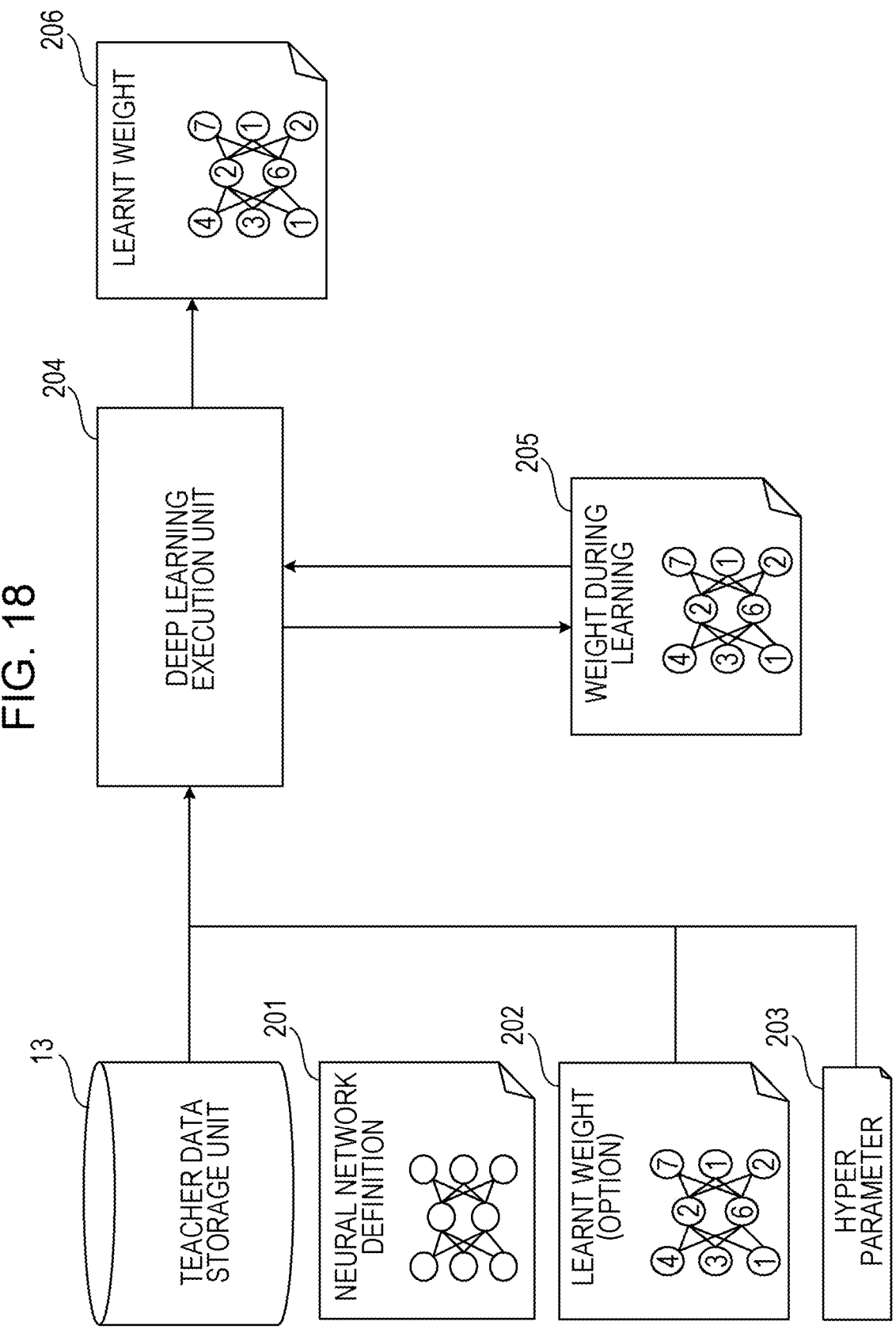
FIG. 18 is a block diagram illustrating an example of an entire learning unit.
Figure 19:
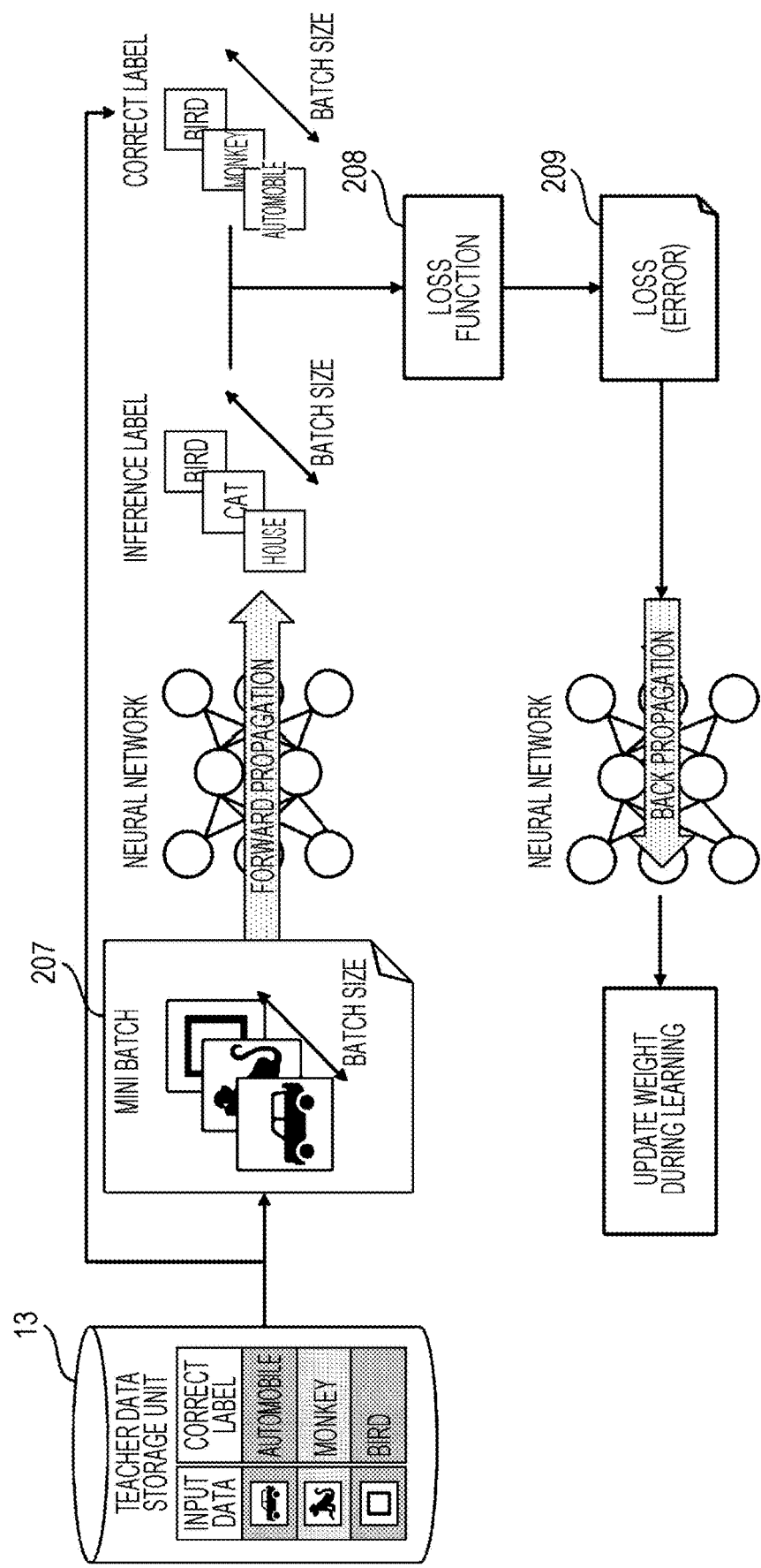
FIG. 19 is a block diagram illustrating another example of the entire learning unit.

FIG. 18 is a block diagram illustrating an example of the entire learning unit, and FIG. 19 is a block diagram illustrating another example of the entire learning unit.

Learning using the teacher data generated by the teacher data generation unit 50 may be performed in the same manner as normal deep learning.

The teacher data storage unit 13 stores teacher data that is a pair of input data (image) generated by the teacher data generation unit 50 and a correct label.

A neural network definition 201 is a file that defines the type of the multi-layered neural network (deep neural network), which indicates how a lot of neurons are interconnected, and is a value assigned by the user.

A learned weight 202 is a user-designated value. Generally, at start of learning, the learned weight is assigned in advance. The learned weight is a file that stores the weight of each neuron in the neural network. It is noted that learning does not necessarily require the learned weight.

A hyper parameter 203 is a group of parameters related to learning, and is a file that stores the number of times learning is made, the frequency of update of weight during learning, and so on.

A weight during learning 205 represents the weight of each neuron in the neural network during learning, and is updated by learning.

A deep learning execution unit 204 fetches the teacher data in the units of mini-batch 207 from the teacher data storage unit 13. The teacher data separates the input data from the correct label to execute forward propagation processing and back propagation processing, thereby updating the weight during learning and outputting the learned weight.

A condition for termination of learning is determined depending on whether the number or times of leaning reaches a designated hyper parameter value, or a loss function 208 falls below a threshold.

Figure 20:
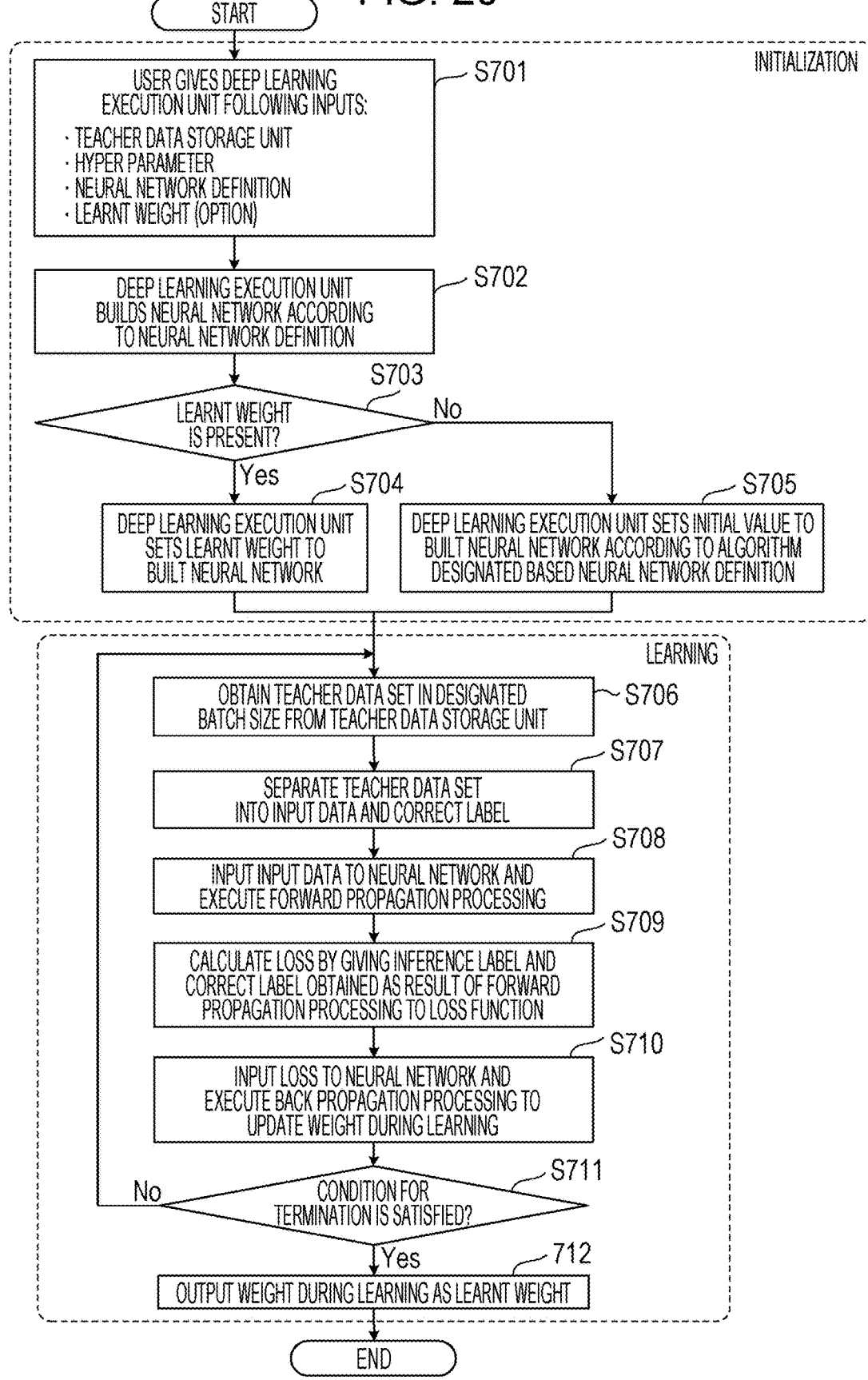
FIG. 20 is a flow chart illustrating an example of the flow of processing of the entire learning unit.

FIG. 20 is a flow chart illustrating the flow of processing of the entire learning unit. Referring to FIGS. 18 and 19, the flow of processing of the entire learning unit will be described below.

In step S701, the user gives the teacher data storage unit 13, the neural network definition 201, the hyper parameter 203, and the optional learned weight 202 to the deep learning execution unit 204, the processing then proceeds to step S702.

In step S702, the deep learning execution unit 204 builds the neural network according to the neural network definition 201, the processing then proceeds to step S703.

In step S703, it is determined whether or not the deep learning execution unit 204 has the learned weight 202.

When it is determined that the deep learning execution unit 204 does not have the learned weight 202, the deep learning execution unit 204 sets an initial value to the built neural network according to the algorithm designated based on the neural network definition 201 (step S705), the processing proceeds to step S706. When it is determined that the deep learning execution unit 204 has the learned weight 202, the deep learning execution unit 204 sets the learned weight 202 to the built neural network (step S704), the processing proceeds to step S706. The initial value is described in the neural network definition 201.

In step S706, the deep learning execution unit 204 obtains a masked teacher data set in the designated batch size from the masked teacher data storage unit 13, the processing then proceeds to step S707.

In step S707, the deep learning execution unit 204 separates the masked teacher data set into "input data" and "correct label", the processing then proceeds to step S708.

In step S708, the deep learning execution unit 204 inputs "input data" to the neural network, and executes forward propagation processing, the processing then proceeds to step S709.

In step S709, the deep learning execution unit 204 gives "inference label" and "correct label" obtained as a result of forward propagation processing to the loss function 208, and calculates the loss 209, the processing then proceeds to step S710. The loss function 208 is described in the neural network definition 201.

In step S710, the deep learning execution unit 204 inputs the loss 209 to the neural network, and executes back propagation processing to update the weight during learning, the processing then proceeds to step S711.

In step S711, the deep learning execution unit 204 determines whether or not the condition for termination is satisfied. When the deep learning execution unit 204 determines that the condition for termination is not satisfied, the processing returns to step S706, and when the deep learning execution unit 204 determines that the condition for termination is satisfied, the processing proceeds to step S712. The condition for termination is described in the hyper parameter 203.

In step S712, the deep learning execution unit 204 outputs the weight during learning as the learned weight and processing is terminated.

<Inference Unit>

The inference unit 300 performs an inference (test) using a learned weight found by the learning unit 200.

Figure 21:
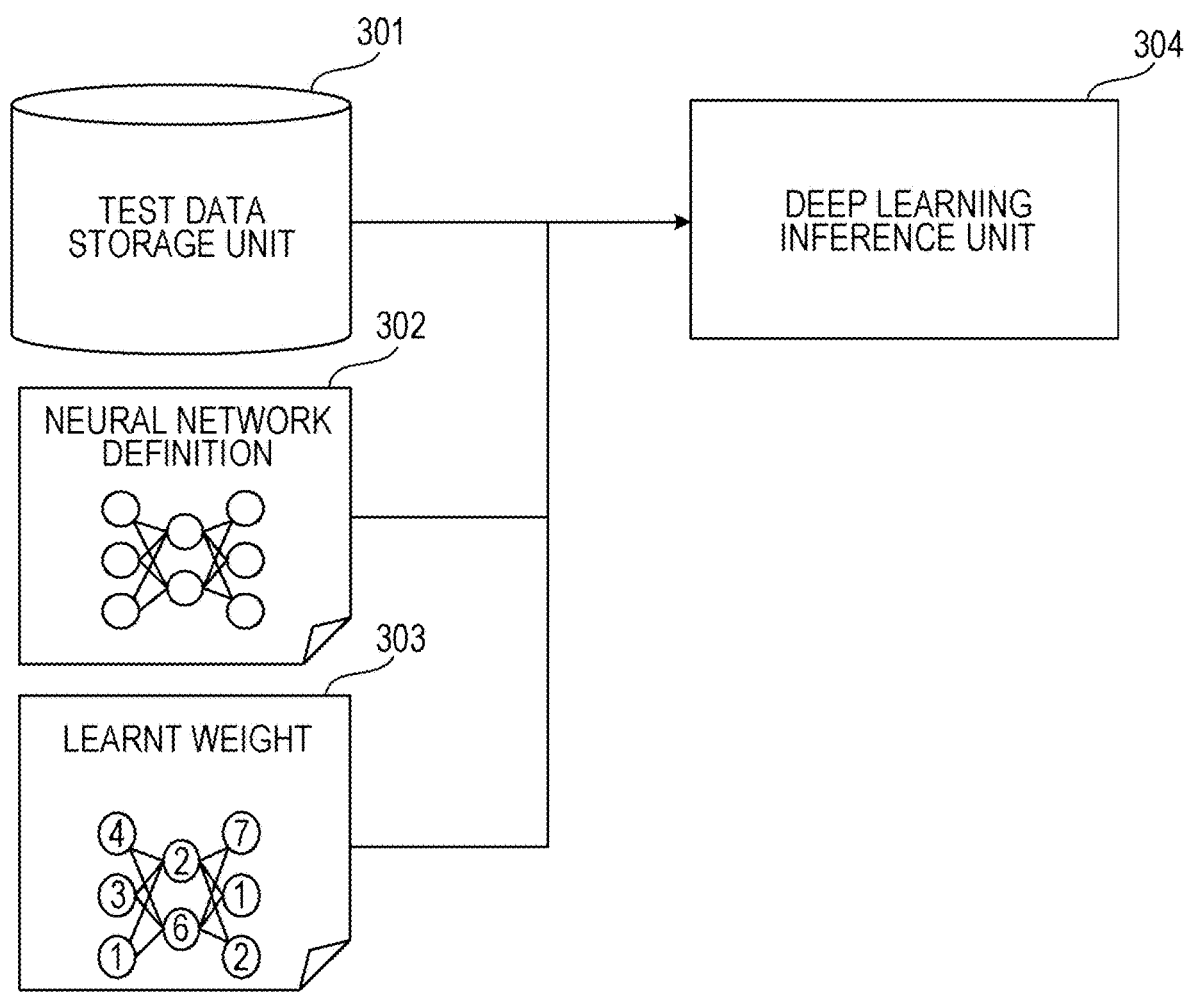
FIG. 21 is a block diagram illustrating an example of an entire inference unit.
Figure 22:
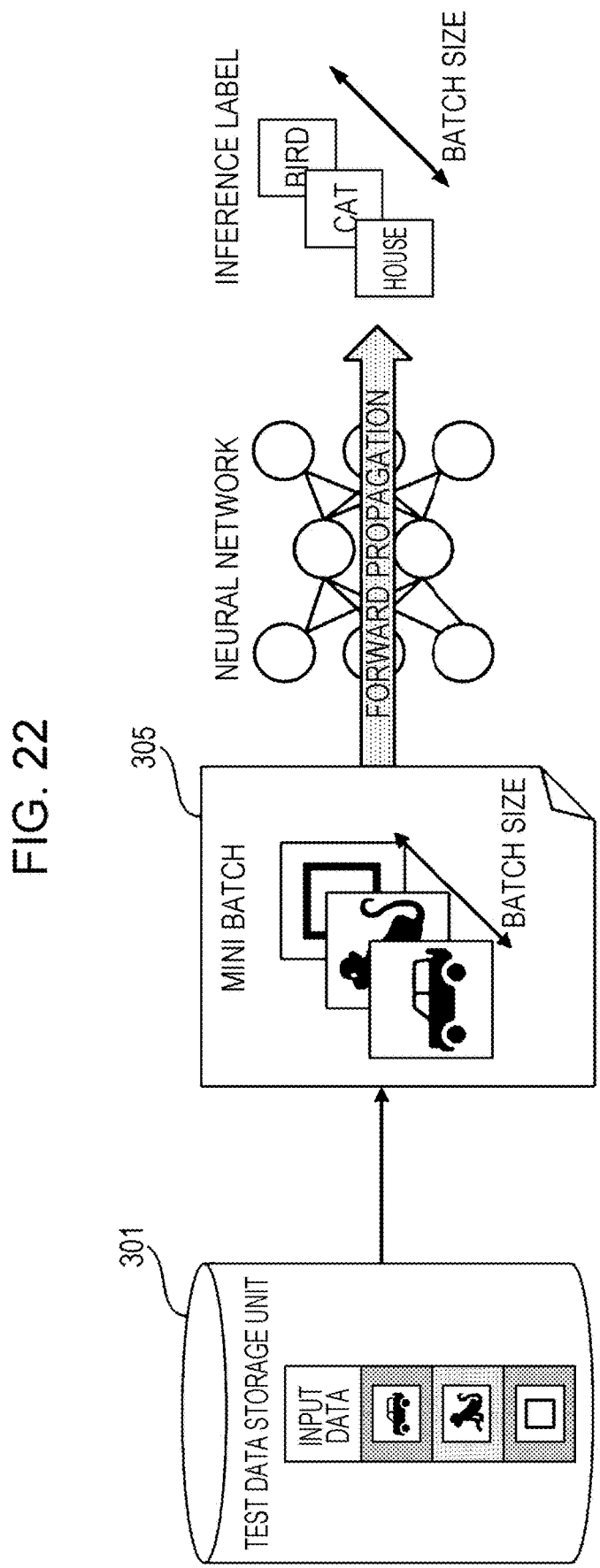
FIG. 22 is a block diagram illustrating another example of the entire inference unit.

FIG. 21 is a block diagram illustrating an example of the inference unit, and FIG. 22 is a block diagram illustrating another example of the inference unit.

Inference using a test data storage unit 301 may be made as in the same manner as normal deep learning inference.

The test data storage unit 301 stores test data for inference. The test data includes only input data (image).

A neural network definition 302 and the neural network definition 201 in the learning unit 200 have the common basic structure.

To evaluate a learning result, a learned weight 303 is usually given.

A deep learning inference unit 304 corresponds to the deep learning execution unit 204 in the learning unit 200.

Figure 23:
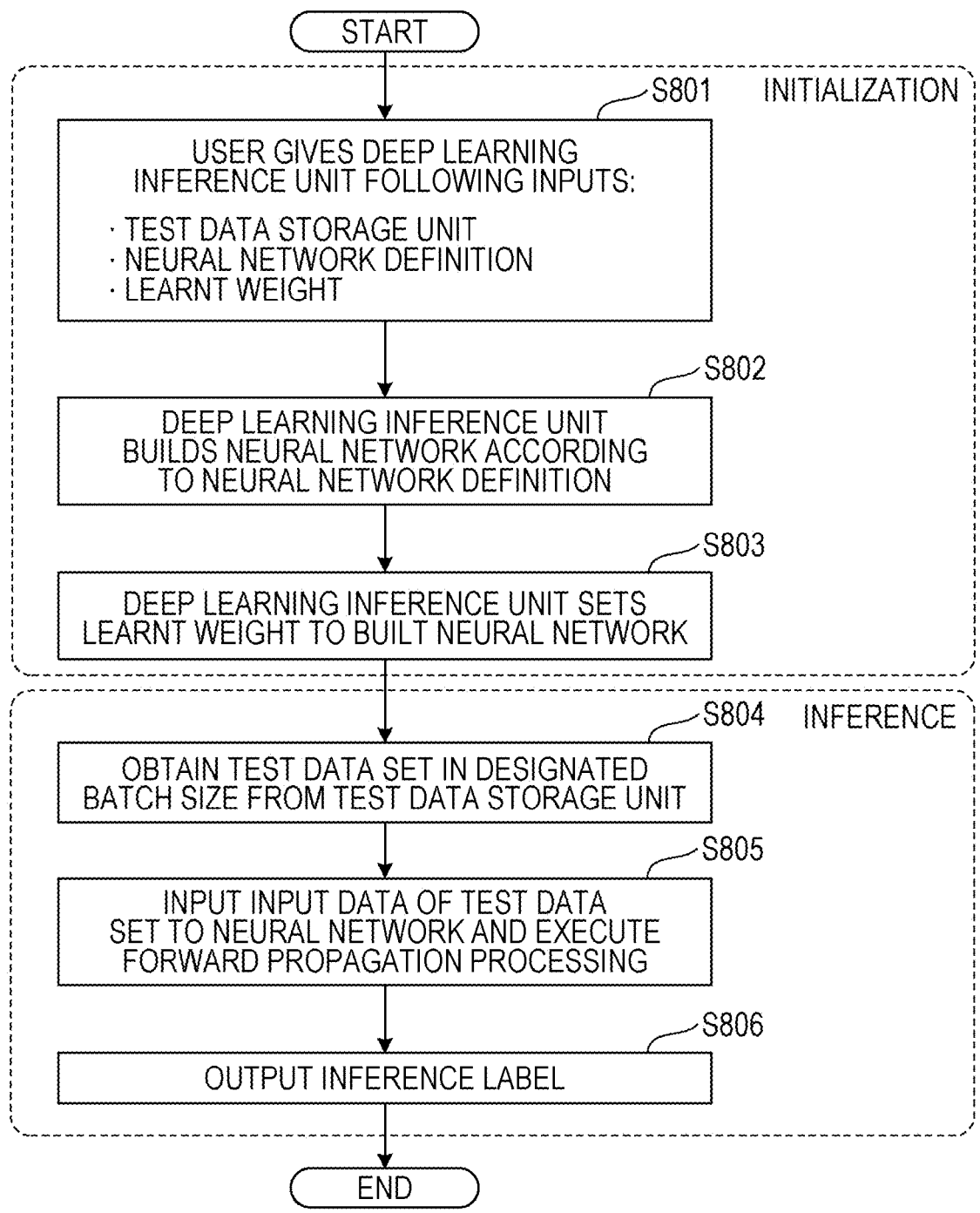
FIG. 23 is a flow chart illustrating an example of the flow of processing of the entire inference unit.

FIG. 23 is a flow chart illustrating the flow of processing of the entire inference unit. Referring to FIGS. 21 and 22, the flow of processing of the entire inference unit will be described below.

In step S801, the user gives the test data storage unit 301, the neural network definition 302, and the learned weight 303 to the deep learning inference unit 304, the processing then proceeds to step S802.

In step S802, when the deep learning inference unit 304 builds the neural network according to the neural network definition 302, the processing proceeds to step S803.

In step S803, the deep learning inference unit 304 sets the learned weight 303 to the built neural network, the processing then proceeds to step S804.

In step S804, the deep learning inference unit 304 obtains a set of masked teacher data in the designated batch size from the test data storage unit 301, the processing then proceeds to step S805.

In step S805, the deep learning inference unit 304 inputs input data of a test data set to the neural network, and executes forward propagation processing, the processing then proceeds to step S806.

In step S806, the deep learning inference unit 304 outputs an inference label and processing is terminated.

When 12 types of automobiles were classified using the image processing apparatus in Embodiment 1, a percentage of correct answers of 92% was obtained.

In the above-mentioned classification, 12 types of commercially available automobiles were adopted. 100 actually-taken images for each of the 12 types, that is, 1200 images in total were used as test data. The teacher data was generated in this embodiment. The percentage of correct answers refers to the rate of correctly-classified images in the 1200 actually-taken images.

The reason for such high percentage of correct answers is that by changing the rendering parameters (for example, texture, shape, illumination, camera) related to the appearance of the recognition target 3D model in a combined manner, variations suitable for deep learning may be increased, and teacher data may be generated in consideration of masking, which is impossible before. Further, by combining the parameters related to the appearance of the recognition target, any irregular state (automobile colored with a paint other than commercially-available paints, highlight clipping caused by illumination, deformation of actually-taken images due to lens deformation) may be recognized. Further, by including masked teacher data, masked actually-taken images may be recognized.

Embodiment 2

Since an image processing apparatus in Embodiment 2 is the same as the image processing apparatus in Embodiment 1 except that teacher data is made permanent, the same elements are given the same reference numbers and description thereof is omitted.

In Embodiment 1, the teacher data generation unit 50 stores generated teacher data in the teacher data storage unit 13, that is, teacher data is made permanent and then, the teacher data is read from the teacher data storage unit 13 to perform learning. In deep learning, as variations of teacher data increase, the recognition rate becomes higher, increasing the amount of data, in turn, costs for storing the teacher data. This problem may be solved by inputting generated teacher data directly to the deep learning execution unit 204.

Learning is collectively performed in mini-batches. The number of pieces of teacher data contained in one mini-batch is referred to as batch size. A certain number of mini-batches are temporarily buffered in a memory or file system. That is, in Embodiment 2, generation and learning of teacher data may be performed in parallel.

Figure 24:
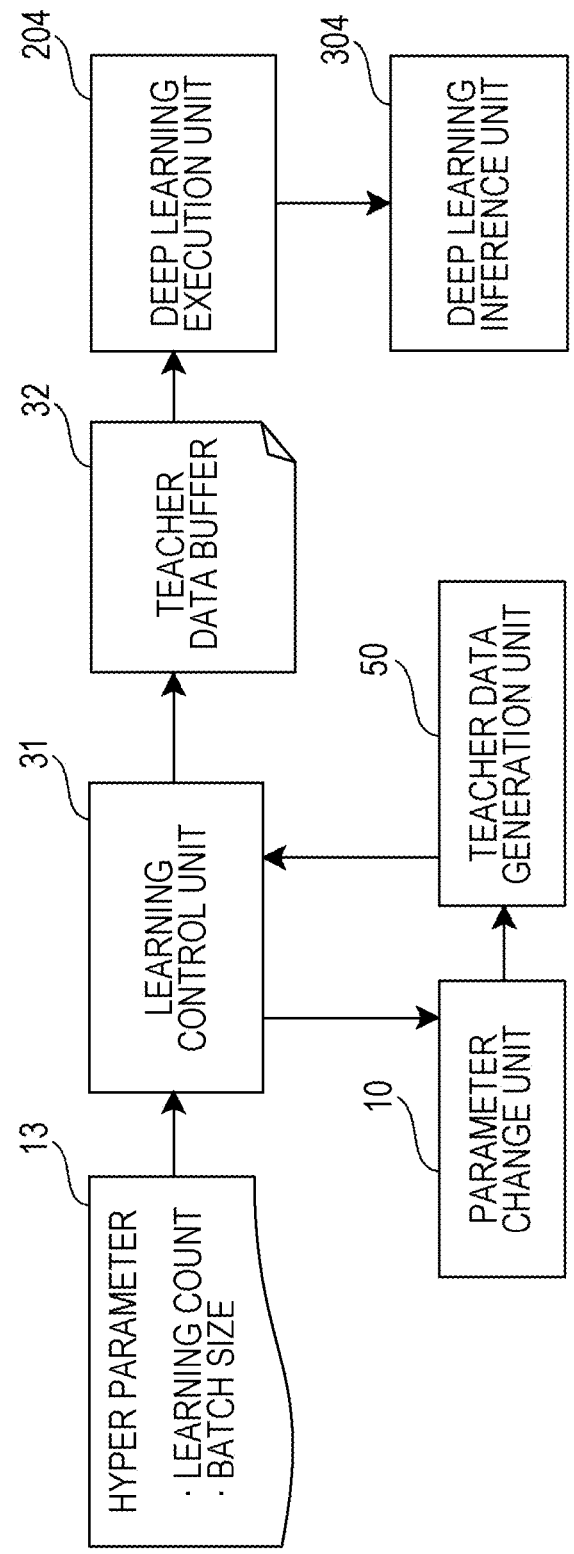
FIG. 24 is a block diagram illustrating an example of an entire image processing apparatus in Embodiment 2.

FIG. 24 is a block diagram illustrating an example of an entire image processing apparatus in Embodiment 2.

A parameter change unit 10 and a teacher data generation unit 50 are the same as those in Embodiment 1.

A teacher data buffer 32 temporarily stores a designated batch size of teacher data generated by the teacher data generation unit 50.

The deep learning execution unit 204 performs learning a designated number of times using the batches stored in the teacher data buffer 32. The deep learning execution unit 204 is the same as the deep learning execution unit 204 in Embodiment 1.

A learning control unit 31 controls generation of teacher data, and inputs mini-batches to the deep learning execution unit 204.

A deep learning inference unit 304 is the same as the deep learning inference unit 304 in Embodiment 1.

FIG. 25 is a flow chart illustrating an example of the flow of processing of the entire image processing apparatus in Embodiment 2. Referring to FIG. 24, the flow of processing of the entire image processing apparatus in Embodiment 2 will be described below.

In step S901, the user designates the learning count and batch size as hyper parameters to the learning control unit 31, the processing then proceeds to step S902.

In step S902, the learning control unit 31 randomly inputs the generation target label to the teacher data generation unit 50, and the teacher data generation unit 50 changes the rendering parameter and inputs the changed rendering parameter to the teacher data generation unit 50, the processing then proceeds to step S903.

In step S903, the learning control unit 31 adds the teacher data generated by the teacher data generation unit 50 to the teacher data buffer 32, the processing then proceeds to step S904.

In step S904, it is determined whether or not the number of pieces of teacher data stored in the teacher data buffer 32 is equal to or larger than the batch size of the hyper parameter.

When it is determined that the number of pieces of teacher data is less than the batch size, the processing returns to step S902. When it is determined that the number of pieces of teacher data is equal to or larger than the batch size, the processing then proceeds to step S905.

In step S905, the learning control unit 31 inputs the mini batch in the teacher data buffer 32 to the deep learning execution unit 204, the processing then proceeds to step S906.

In step S906, the deep learning execution unit 204 starts to learn the inputted mini batch, the processing then proceeds to step S907.

In step S907, the learning control unit 31 clears the teacher data buffer 32, and the processing proceeds to steps S902 and S908.

In step S908, the deep learning execution unit 204 complete learning of the mini batch, and increments the learning count, the processing then proceeds to step S909.

In step S909, the deep learning execution unit 204 determines whether or not the current learning count reaches a user-designated value.

When it is determined that the learning count does not reach the user-designated value, the processing proceeds to step S910, and when next mini batch are inputted, the processing proceeds to step S906. When it is determined that the learning count reaches the user-designated value, processing is terminated.

When the automobiles were classified using the image processing apparatus in Embodiment 2 as in the same manner as Embodiment 1, the same percentage of correct answers as that in Embodiment 1 may be obtained.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing apparatus comprising:
   a memory, and
   a processor coupled to the memory and configured to execute an image recognition process comprising:
   changing a rendering parameter in a three-dimensional model of a recognition target, the rendering parameter includes at least one or any combination of ones selected from texture for the three-dimensional model of the recognition target, a shape of the three-dimensional model of the recognition target, a camera position for the three-dimensional model of the recognition target, a camera orientation for the three-dimensional model of the recognition target, a camera viewing angle for the three-dimensional model of the recognition target, an illumination condition of the three-dimensional model of the recognition target, a background three-dimensional model, a masking ratio, and a storage condition of a teacher image;
   generating teacher data of the recognition target based on the rendering parameter changed by the changing; and
   generating a teacher image having the masking ratio that is equal to or smaller than a masking ratio threshold, wherein the masking ratio threshold is set for each class of the three-dimensional model of the recognition target.

2. The image processing apparatus according to claim 1, the process further comprising: generating a camera model by changing at least one of the camera position, the camera orientation or the camera viewing angle for the three-dimensional model of the recognition target.

3. The image processing apparatus according to claim 1, the process further comprising: generating an illumination model by changing the illumination condition for the three-dimensional model of the recognition target.

4. The image processing apparatus according to claim 1, the process further comprising: fetching a background three-dimensional model from a storage unit.

5. The image processing apparatus according to claim 1, the process further comprising: performing a machine learning using the generated teacher data.

6. The image processing apparatus according to claim 5, the process further comprising: performing an inference using a learned weight found in the performing.

7. An image processing method performed by a computer, the method comprising:
   changing a rendering parameter in a three-dimensional model of a recognition target, the rendering parameter includes at least one or any combination of ones selected from texture for the three-dimensional model of the recognition target, a shape of the three-dimensional model of the recognition target, a camera position for the three-dimensional model of the recognition target, a camera orientation for the three-dimensional model of the recognition target, a camera viewing angle for the three-dimensional model of the recognition target, an illumination condition of the three-dimensional model of the recognition target, a background three-dimensional model, a masking ratio, and a storage condition of a teacher image;
   generating teacher data of the recognition target based on the rendering parameter changed by the changing; and
   generating a teacher image having the masking ratio that is equal to or smaller than a masking ratio threshold, wherein the masking ratio threshold is set for each class of the three-dimensional model of the recognition target.

8. A non-transitory computer-readable medium storing an image processing program for causing a computer to perform an image recognition process, the process comprising:
   changing a rendering parameter in a three-dimensional model of a recognition target, the rendering parameter includes at least one or any combination of ones selected from texture for the three-dimensional model of the recognition target, a shape of the three-dimensional model of the recognition target, a camera position for the three-dimensional model of the recognition target, a camera orientation for the three-dimensional model of the recognition target, a camera viewing angle for the three-dimensional model of the recognition target, an illumination condition of the three-dimensional model of the recognition target, a background three-dimensional model, a masking ratio, and a storage condition of a teacher image;
   generating teacher data of the recognition target based on the rendering parameter changed by the changing; and
   generating a teacher image having the masking ratio that is equal to or smaller than a masking ratio threshold, wherein the masking ratio threshold is set for each class of the three-dimensional model of the recognition target.

9. An image processing apparatus comprising:
   a memory storing instructions;
   a central processor coupled to the memory; and
   a graphics processor coupled to the memory and the central processor, the instructions causing the central processor and the graphics processor to execute an image recognition process of:
   acquiring a recognition target;
   rendering, by the graphics processor, a three-dimensional model of the recognition target;
   changing a parameter of the three-dimensional model, the rendering parameter includes at least one or any combination of ones selected from texture for the three-dimensional model of the recognition target, a shape of the three-dimensional model of the recognition target, a camera position for the three-dimensional model of the recognition target, a camera orientation for the three-dimensional model of the recognition target, a camera viewing angle for the three-dimensional model of the recognition target, an illumination condition of the three-dimensional model of the recognition target, a background three-dimensional model, a masking ratio, and a storage condition of a teacher image;

generating, by the central processor, teacher data of the recognition target based on the parameter changed; and generating a teacher image having the masking ratio that is equal to or smaller than a masking ratio threshold, wherein the masking ratio threshold is set for each class of the three-dimensional model of the recognition target.

\* \* \* \* \*